(12) United States Patent
Austrheim et al.

(10) Patent No.: US 11,673,712 B2
(45) Date of Patent: Jun. 13, 2023

(54) STORAGE CONTAINER FOR AUTOMATED STORAGE AND RETRIEVAL SYSTEM

(71) Applicant: Autostore Technology AS, Nedre Vats (NO)

(72) Inventors: Trond Austrheim, Etne (NO); Uwe Gruenbeck, Nedre Vats (NO)

(73) Assignee: Autostore Technology AS, Nedre Vats (NO)

( * ) Notice: Subject to any disclaimer, the term of this patent is extended or adjusted under 35 U.S.C. 154(b) by 0 days.

(21) Appl. No.: 17/296,734

(22) PCT Filed: Nov. 28, 2019

(86) PCT No.: PCT/EP2019/082955
§ 371 (c)(1),
(2) Date: May 25, 2021

(87) PCT Pub. No.: WO2020/109495
PCT Pub. Date: Jun. 4, 2020

(65) Prior Publication Data
US 2021/0387769 A1    Dec. 16, 2021

(30) Foreign Application Priority Data
Nov. 28, 2018  (NO) .................................. 20181530

(51) Int. Cl.
*B65D 25/00* (2006.01)
*B65D 1/22* (2006.01)
(Continued)

(52) U.S. Cl.
CPC ............. *B65D 25/005* (2013.01); *B65D 1/22* (2013.01); *B65D 21/0209* (2013.01); *B65D 25/02* (2013.01); *B65G 1/04* (2013.01)

(58) Field of Classification Search
CPC ........ B65G 1/10; B65G 1/026; B65D 25/005; B65D 2519/00273; B65D 2519/00298;
(Continued)

(56) References Cited

U.S. PATENT DOCUMENTS

| | | | | |
|---|---|---|---|---|
| 4,036,345 A | * | 7/1977 | Webb | ....................... B65G 7/02 |
| | | | | 193/35 MD |
| 4,714,026 A | * | 12/1987 | Yamaguchi | ........ B65D 19/0012 |
| | | | | 108/57.29 |

(Continued)

FOREIGN PATENT DOCUMENTS

| | | |
|---|---|---|
| CN | 1541178 A | 10/2004 |
| CN | 1895971 A | 1/2007 |

(Continued)

OTHER PUBLICATIONS

Search Report issued in Norwegian Application No. 20181530; dated May 23, 2019 (2 pages).

(Continued)

*Primary Examiner* — Andrew T Kirsch
(74) *Attorney, Agent, or Firm* — Osha Bergman Watanabe & Burton LLP

(57) ABSTRACT

A storage container for storing product items in an automated storage and retrieval system includes a base; two first parallel side walls; two second parallel side walls perpendicular to the two first parallel side walls; a top opening; and two side openings. The two side openings allow one or more items to be unloaded from the storage container or loaded into the storage container through one of the side openings at an unloading station or at a loading station. The storage container is provided with a restraint which is arranged to restrain movement of the one or more items from exiting through one of the side openings during transportation of the storage container to the unloading or loading station.

15 Claims, 19 Drawing Sheets

(51) Int. Cl.
*B65D 21/02* (2006.01)
*B65D 25/02* (2006.01)
*B65G 1/04* (2006.01)

(58) Field of Classification Search
CPC .. B65D 2519/00308; B65D 2519/0083; B65D 88/58
See application file for complete search history.

(56) References Cited

U.S. PATENT DOCUMENTS

| | | | | |
|---|---|---|---|---|
| 5,147,061 | A | * | 9/1992 | Karpisek ............... B65D 77/061 220/826 |
| 5,474,197 | A | * | 12/1995 | Hillis ................. B65D 11/1833 220/4.28 |
| 7,861,863 | B2 | * | 1/2011 | Meissen ............... B65D 21/062 206/506 |
| 10,059,519 | B2 | | 8/2018 | Hofmann |
| 2008/0083354 | A1 | * | 4/2008 | Markert ............. B65D 71/0096 108/55.3 |
| 2011/0008138 | A1 | | 1/2011 | Yamashita |
| 2015/0284181 | A1 | * | 10/2015 | Sullinger ............. B65D 77/061 222/333 |
| 2017/0361982 | A1 | | 12/2017 | Kelly |

FOREIGN PATENT DOCUMENTS

| | | | |
|---|---|---|---|
| CN | 101522509 | A | 9/2009 |
| CN | 102646613 | A | 8/2012 |
| CN | 202924013 | U | 5/2013 |
| CN | 103764520 | A | 4/2014 |
| CN | 104245474 | A | 12/2014 |
| CN | 206188003 | U | 5/2017 |
| CN | 108778961 | A | 11/2018 |
| DE | 102008007768 | A1 | 8/2009 |
| DE | 202009012885 | U1 | 12/2009 |
| EP | 1760000 | A1 | 3/2007 |
| EP | 1923317 | A2 | 5/2008 |
| GB | 2544648 | A | 5/2017 |
| JP | S6485656 | A | 3/1989 |
| KR | 10-2016-0001640 | A | 1/2016 |
| NO | 154125 | B | 4/1986 |
| NO | 317366 | B1 | 10/2004 |
| WO | 2014075937 | A1 | 5/2014 |
| WO | 2014090684 | A1 | 6/2014 |
| WO | 2015193278 | A1 | 12/2015 |
| WO | 2016092034 | A1 | 6/2016 |
| WO | 2016196815 | A1 | 12/2016 |
| WO | 2016198467 | A1 | 12/2016 |
| WO | 2016198565 | A1 | 12/2016 |
| WO | 2017081281 | A1 | 5/2017 |

OTHER PUBLICATIONS

International Search Report issued in International Application No. PCT/EP2019/082955, dated Feb. 25, 2020 (5 pages).
Written Opinion issued in International Application No. PCT/EP2019/082955; dated Feb. 25, 2020 (6 pages).
Office Action issued in Chinese Application No. 2019800783144 dated May 30, 2022 (12 pages).

* cited by examiner

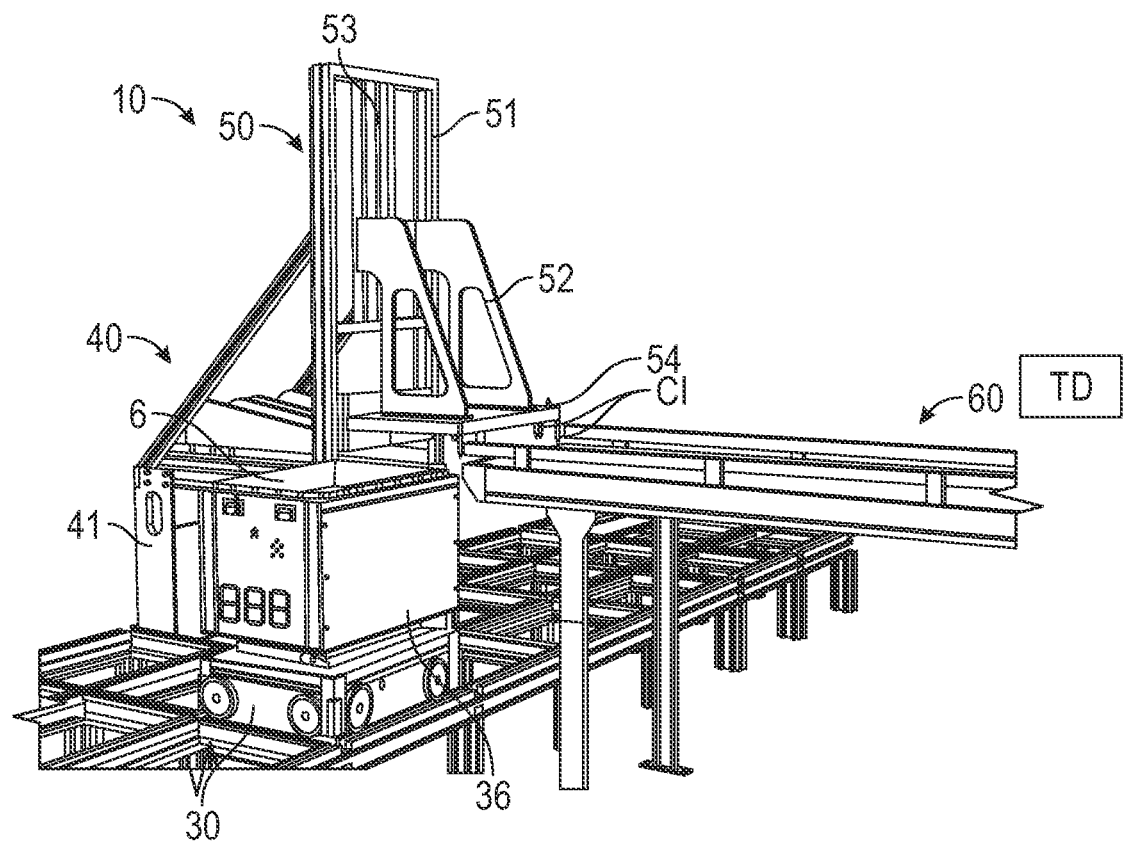
FIG. 8A
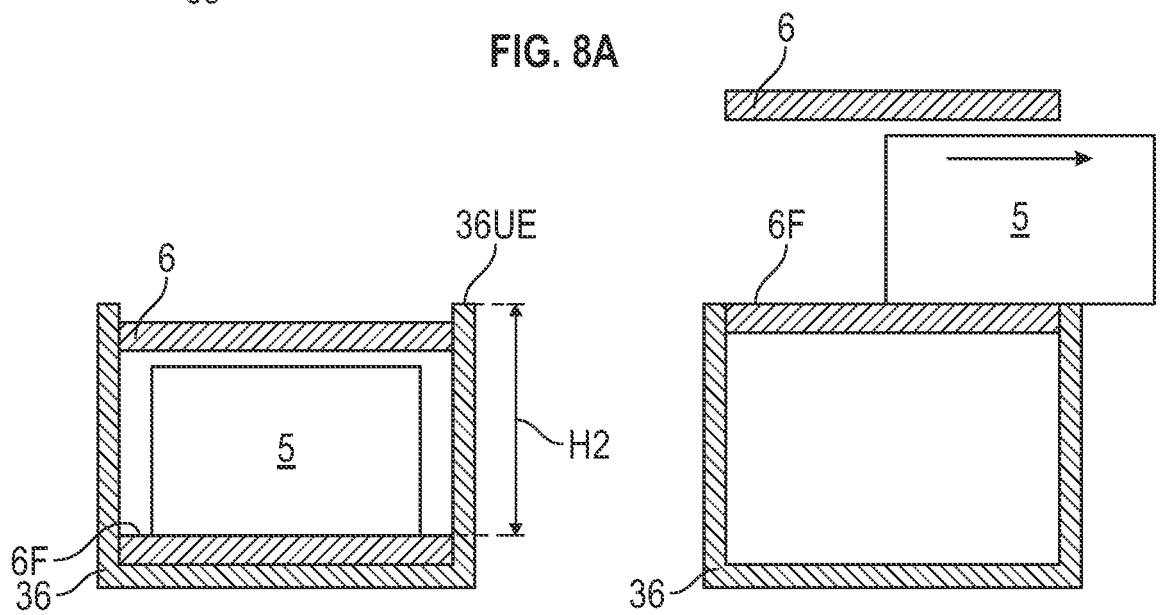
FIG. 8B
FIG. 8C

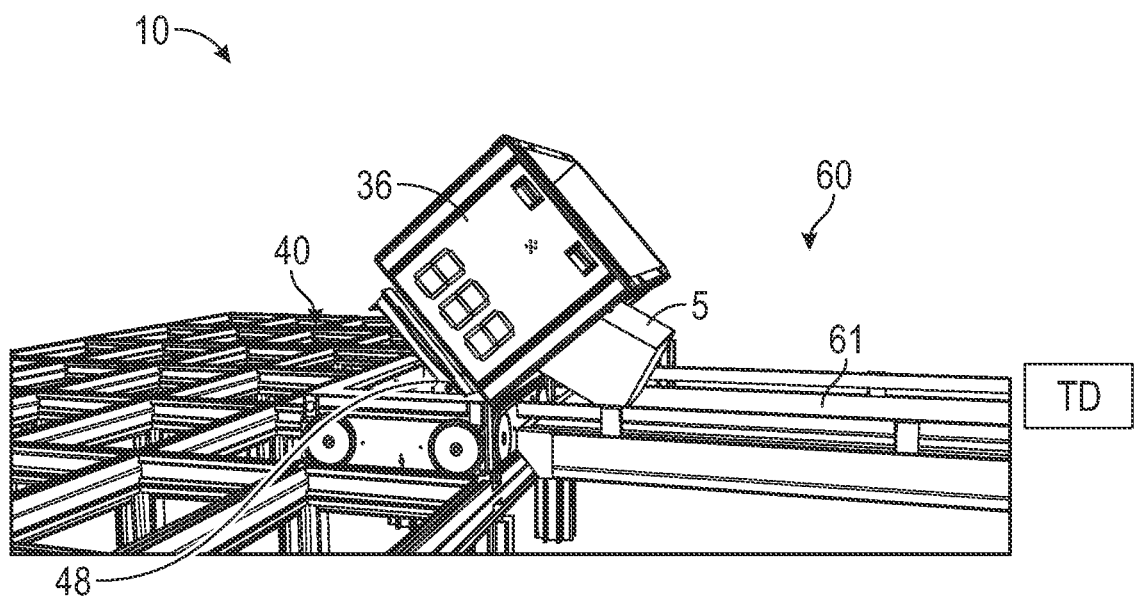
FIG. 10A
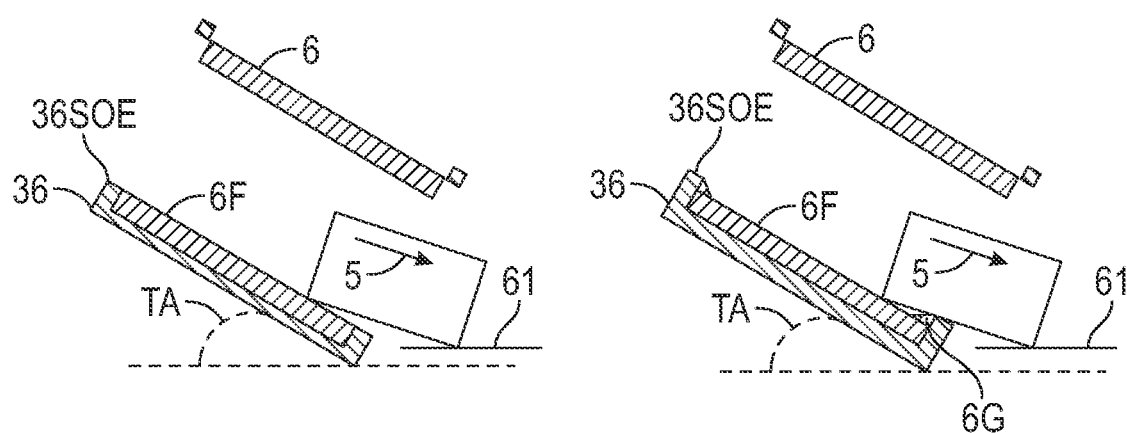
FIG. 10B
FIG. 10C

STORAGE CONTAINER FOR AUTOMATED STORAGE AND RETRIEVAL SYSTEM

TECHNICAL FIELD

The present invention relates to a storage container for an automated storage and retrieval system.

BACKGROUND AND PRIOR ART

FIGS. 1A and 1C disclose a typical prior art automated storage and retrieval system 1 with a framework structure 100. FIGS. 1B and 1D disclose a prior art container handling vehicle 200, 300 operating the system 1 disclosed in FIGS. 1A and 1C, respectively.

The framework structure 100 comprises a plurality of upright members 102 and optionally a plurality of horizontal members 103 supporting the upright members 102. The members 102, 103 may typically be made of metal, e.g. extruded aluminum profiles.

The framework structure 100 defines a storage grid 104 comprising storage columns 105 arranged in rows, in which storage columns 105 storage containers 106, also known as bins, are stacked one on top of another to form stacks 107.

Each storage container 106 may typically hold a plurality of product items (not shown), and the product items within a storage container 106 may be identical, or may be of different product types depending on the application.

The storage grid 104 guards against horizontal movement of the storage containers 106 in the stacks 107, and guides vertical movement of the storage containers 106, but does normally not otherwise support the storage containers 106 when stacked.

The automated storage and retrieval system 1 comprises a container handling vehicle rail system 108 arranged in a grid pattern across the top of the storage 104, on which rail system 108 a plurality of container handling vehicles 200, 300 (as exemplified in FIGS. 1B and 1D) are operated to raise storage containers 106 from, and lower storage containers 106 into, the storage columns 105, and also to transport the storage containers 106 above the storage columns 105. The horizontal extent of one of the grid cells 122 constituting the grid pattern is in FIGS. 1A and 1C marked by thick lines.

Each grid cell 122 has a width which is typically within the interval of 30 to 150 cm, and a length which is typically within the interval of 50 to 200 cm. Each grid opening 115 has a width and a length which is typically 2 to 10 cm less than the width and the length of the grid cell 122 due to the horizontal extent of the rails 110,111.

The rail system 108 comprises a first set of parallel rails 110 arranged to guide movement of the container handling vehicles 200,300 in a first direction X across the top of the frame structure 100, and a second set of parallel rails 111 arranged perpendicular to the first set of rails 110 to guide movement of the container handling vehicles 200,300 in a second direction Y which is perpendicular to the first direction X. In this way, the rail system 108 defines grid columns 112 above which the container handling vehicles 200,300 can move laterally above the storage columns 105, i.e. in a plane which is parallel to the horizontal X-Y plane.

Each prior art container handling vehicle 200,300 comprises a vehicle body and a wheel arrangement of eight wheels 201,301 where a first set of four wheels enable the lateral movement of the container handling vehicles 200,300 in the X direction and a second set of the remaining four wheels enable the lateral movement in the Y direction. One or both sets of wheels in the wheel arrangement can be lifted and lowered, so that the first set of wheels and/or the second set of wheels can be engaged with the respective set of rails 110, 111 at any one time.

Each prior art container handling vehicle 200,300 also comprises a lifting device (not shown) for vertical transportation of storage containers 106, e.g. raising a storage container 106 from, and lowering a storage container 106 into, a storage column 105. The lifting device comprises one or more gripping/engaging devices (not shown) which are adapted to engage a storage container 106, and which gripping/engaging devices can be lowered from the vehicle 200,300 so that the position of the gripping/engaging devices with respect to the vehicle 200,300 can be adjusted in a third direction Z which is orthogonal the first direction X and the second direction Y.

Conventionally, and also for the purpose of this application, Z=1 identifies the uppermost layer of the grid 104, i.e. the layer immediately below the rail system 108, Z=2 the second layer below the rail system 108, Z=3 the third layer etc. In the exemplary prior art grid 104 disclosed in FIGS. 1A and 1C, Z=8 identifies the lowermost, bottom layer of the grid 104. Consequently, as an example, and using the Cartesian coordinate system X, Y, Z indicated in FIGS. 1A and 1D, the storage container identified as 106' in FIG. 1A can be said to occupy grid location or cell X=10, Y=2, Z=3. The container handling vehicles 200,300 can be said to travel in layer Z=0 and each grid column 112 can be identified by its X and Y coordinates.

Each container handling vehicle 200 comprises a storage compartment or space (not shown) for receiving and stowing a storage container 106 when transporting the storage container 106 across the rail system 108. The storage space may comprise a cavity arranged centrally within the vehicle body, e.g. as is described in WO2014/090684A1, the contents of which are incorporated herein by reference.

Alternatively, the container handling vehicles 300 may have a cantilever construction, as is described in NO317366, the contents of which are also incorporated herein by reference.

The container handling vehicles 200 may have a footprint, i.e. an extent in the X and Y directions, which is generally equal to the lateral extent of a grid cell 122, i.e. the extent of a grid cell 122 in the X and Y directions, e.g. as is described in WO2015/193278A1, the contents of which are incorporated herein by reference. The term "lateral" used herein may mean "horizontal".

Alternatively, the container handling vehicles 200 may have a footprint which is larger than the lateral extent of (lateral area defined by) a grid column 112, e.g. as is disclosed in WO2014/090684A1.

The rail system 108 may be a single track system, as is shown in FIG. 2A. Alternatively, the rail system 108 may be a double track system, as is shown in FIG. 2B, thus allowing a container handling vehicle 201 having a footprint 202,202' generally corresponding to the lateral area defined by a grid column 112 to travel along a row of grid columns 112 even if another container handling vehicle 200 is positioned above a grid column 112 neighboring that row. Both the single and double track system, or a combination comprising a single and double track arrangement in a single rail system 108, forms a grid pattern in the horizontal plane P comprising a plurality of rectangular and uniform grid locations or grid cells 122, where each grid cell 122 comprises a grid opening 115 being delimited by a pair of rails 110a,110b of the first rails 110 and a pair of rails 111a,111b of the second set of rails 111. In FIG. 2B the grid cell 122 is indicated by a dashed box.

Consequently, rails 110a and 110b form pairs of neighboring rails defining parallel rows of grid cells running in the X direction, and rails 111a and 111b form pairs of neighboring rails defining parallel rows of grid cells running in the Y direction.

As shown in FIG. 2C, each grid cell 122 has a width $W_c$ which is typically within the interval of 30 to 150 cm, and a length L which is typically within the interval of 50 to 200 cm. Each grid opening 115 has a width $W_o$ and a length $L_o$ which is typically 2 to 10 cm less than the width $W_c$ and the length $L_c$ of the grid cell 122.

In the X and Y directions, neighboring grid cells 122 are arranged in contact with each other such that there is no space there-between.

In a storage grid 104, a majority of the grid columns 112 are storage columns 105, i.e. grid columns 112 where storage containers 106 are stored in stacks 107. However, a grid 104 normally has at least one grid column 112 which is used not for storing storage containers 106, but which comprises a location where the container handling vehicles 200,300 can drop off and/or pick up storage containers 106 so that they can be transported to a second location (not shown) where the storage containers 106 can be accessed from outside of the grid 104 or transferred out of or into the grid 104. Within the art, such a location is normally referred to as a "port" and the grid column 112 in which the port is located may be referred to as a "delivery column" 119,120. The drop-off and pick-up ports of the container handling vehicles are referred to as the "upper ports of a delivery column" 119,120. While the opposite end of the delivery column is referred to as the "lower ports of a delivery column".

The storage grids 104 in FIGS. 1A and 1C comprise two delivery columns 119 and 120. The first delivery column 119 may for example comprise a dedicated drop-off port where the container handling vehicles 200,300) can drop off storage containers 106 to be transported through the delivery column 119 and further to an access or a transfer station (not shown), and the second delivery column 120 may comprise a dedicated pick-up port where the container handling vehicles 200,300 can pick up storage containers 106 that have been transported through the delivery column 120 from an access or a transfer station (not shown). Each of the ports of the first and second delivery column 119,120 may comprise a port suitable for both pick up and drop of storage containers 106.

The second location may typically be a picking or a stocking station where product items are removed from or positioned into the storage containers 106. In a picking or a stocking station, the storage containers 106 are normally never removed from the automated storage and retrieval system 1, but are returned into the storage grid 104 once accessed.

For transfer of storage containers out or into the storage grid 104, there are also lower ports provided in a delivery column, such lower ports are e.g. for transferring storage containers 106 to another storage facility (e.g. to another storage grid), directly to a transport vehicle (e.g. a train or a lorry), or to a production facility.

For monitoring and controlling the automated storage and retrieval system 1 (e.g. monitoring and controlling the location of respective storage containers 106 within the storage grid 104; the content of each storage container 106; and the movement of the container handling vehicles 200, 300 so that a desired storage container 106 can be delivered to the desired location at the desired time without the container handling vehicles 200,300 colliding with each other), the automated storage and retrieval system 1 comprises a control system (not shown) which typically is computerized and which typically comprises a database for keeping track of the storage containers 106.

A conveyor system comprising conveyors may be employed to transport the storage containers between the lower port of the delivery column 119,120 and the access station.

If the lower port of the delivery column 119,120 and the access station are located at different levels, the conveyor system may comprise a lift device for transporting the storage containers 106 vertically between the port and the access station.

The conveyor system may be arranged to transfer storage containers between different grids, e.g. as is described in WO2014/075937A1, the contents of which are incorporated herein by reference.

Further, WO2016/198467A1, the contents of which are incorporated herein by reference, disclose an example of a prior art access system having conveyor belts (FIGS. 5a and 5b in WO2016/198467A1) and a frame mounted rail (FIGS. 6a and 6b in WO2016/198467A1) for transporting storage containers between delivery columns and work stations where operators can access the storage containers.

When a storage container 106 stored in the grid 104 disclosed in FIG. 1A is to be accessed, one of the container handling vehicles 200,300 is instructed to retrieve the target storage container 106 from its position in the grid 104 and to transport it to or through the delivery column 119. This operation involves moving the container handling vehicle 200,300 to a grid location above the storage column 105 in which the target storage container 106 is positioned, retrieving the storage container 106 from the storage column 105 using the container handling vehicle's lifting device (not shown), and transporting the storage container 106 to the delivery column 119, the target storage container 106 is located deep within a stack 107, i.e. with one or a plurality of other storage containers positioned above the target storage container 106, the operation also involves temporarily moving the above-positioned storage containers prior to lifting the target storage container 106 from the storage column 105. This step, which is sometimes referred to as "digging" within the art, may be performed with the same container handling vehicle 200,300 that is subsequently used for transporting the target storage container 106 to the delivery column, or with one or a plurality of other cooperating container handling vehicles 200,300. Alternatively, or in addition, the automated storage and retrieval system 1 may have container handling vehicles 200,300 specifically dedicated to the task of temporarily removing storage containers 106 from a storage column 105. Once the target storage container 106 has been removed from the storage column 105, the temporarily removed storage containers can be repositioned into the original storage column 105. However, the removed storage containers may alternatively be relocated to other storage columns 105.

When a storage container 106 is to be stored in the grid 104, one of the container handling vehicles 200,300 is instructed to pick up the storage container 106 from the delivery column 120 and to transport it to a grid location above the storage column 105 where it is to be stored. After any storage containers positioned at or above the target position within the storage column stack 107 have been removed, the container handling vehicle 200,300 positions the storage container 106 at the desired position. The removed storage containers may then be lowered back into the storage column 105, or relocated to other storage columns 105.

A problem associated with known automated storage and retrieval systems 1 is that the area surrounding the pick-up and drop-off ports may become congested with container handling vehicles 200,300 instructed to drop off or pick up storage containers 106. This may seriously impede the operation of the automated storage and retrieval system 1. In small systems this situation may possibly be alleviated by adding delivery columns to the grid, as this will allow the container handling vehicles 200,300 to be distributed among a larger number of ports of delivery columns in order to avoid congestion. However, if ports and columns are added, the conveyor system infrastructure must normally be increased. This requires space, which may not necessarily be available. Also, adding conveyor system infrastructure is costly.

Another problem with prior art automated storage and retrieval systems 1 is that the separate drop-off ports and pick-up ports of the delivery columns 119,120 require the container handling vehicles 200,300 to move to a storage column 105 after drop-off to retrieve a new storage container 106. Likewise, the container handling vehicles 200,300 have to be empty of a storage container 106 when they are sent to a pick-up port 120 to pick up a storage container. This results in an inefficiency and causes increased congestion around the ports, as container handling vehicles 200,300 are moving around on the grid without a storage container 106 as payload. In addition, the delivery columns 119,120 may take up space on the grid 104 which could be used for other purposes such as the movement of container handling vehicles 200,300.

It is known, for example from WO2016/198565, to provide the above automated storage and retrieval system with a robot device comprising a movable arm with a picking mechanism in one end thereof, for moving product items between storage containers 106. The robot device can be fixed to the grid or it can be fixed to the ceiling of the building in which the grid is located. The robot device in this prior art is used to move product items between storage containers 106 located on the top level of the grid and storage containers 106 located on a conveyor belt of a conveyor system.

Also here, the area surrounding the robot device may become congested with container handling vehicles 200,300 instructed to drop off or pick up storage containers 106. Moreover, adding conveyor system infrastructure is costly.

GB 2544648 (Ocado Innovation) discloses an automated storage and retrieval system with a robot device for picking product items where the robot device is fixed to a robot vehicle, thereby forming a picking vehicle. Container handling vehicles are moved adjacent to this picking vehicle and the picking vehicle moves product items between the containers held by the container handling vehicles. The container handling vehicles comprise a top opening allowing the picking vehicle to access the container from above.

It is also known from the above publication that product items are picked from a container into a plurality of end-customer shipping packages located in the destination container. The destination container with these shipping packages is then transported to a port where the shipping packages are retrieved from the container, before they are closed, and possibly addressed and stamped. This is typically a manual operation.

One object of the present invention is to provide a storage container which enables automatic and more efficient unloading and loading of product items out from and into the storage container in such automated storage and retrieval systems.

A further object is to provide a storage container where loading and unloading may take place while the storage container is being transported by a vehicle, and where loading and unloading may take place when the storage container is not being transported by a vehicle.

SUMMARY OF THE INVENTION

The present invention relates to a storage container for storing product items in an automated storage and retrieval system, wherein the storage container comprises:

a base;

two first parallel side walls;

two second parallel side walls perpendicular to the two first parallel side walls;

a top opening;

two side openings, to allow one or more items to be unloaded from the storage container or loaded into the storage container through one of the side openings at an unloading station or at a loading station;

wherein the storage container is provided with a restraint which is arranged to restrain movement of the one or more items from exiting through one of the side openings during transportation of the storage container to the unloading or loading station.

In one aspect, the term "unloading" refers to pushing one or more product items out from the storage container by means of an unloading member of an unloading device located at the unloading station. The term unloading may also refer to the tipping or tilting of the storage container to cause the product item to slide out from the storage container through one of the side openings.

In one aspect, the term "loading" refers to pushing one or more product items into the storage container by means of a loading member of a loading device located at the loading station, similar to the unloading member of the unloading device. The term loading may also refer to product items sliding into the storage container through one of the side openings. The product items may for example slide down an inclined surface into the storage container.

It should also be noted that the term "station" is to be interpreted broadly. For example, the storage container may or may not be carried by a vehicle when unloading or loading is performed at the unloading or loading "station". Hence, a port is considered to be a station where loading or unloading of the storage container may take place.

In one aspect, the side openings have a width equal to the width of the storage container minus the thickness of the second side walls. Hence, the side openings are as wide as the base surface inside the storage container.

In one aspect, the restraint comprises a lip protruding upwardly from the base at a lower edge of one of the side openings.

In one aspect, there can be one lip at the lower edge of each of the side openings.

Alternatively, the lower edge of the side openings is formed by the base surface of the base.

In one aspect, the lip is continuous, intermittent or broken.

In one aspect, the lip is movably connected to the base, and where the lip is configured to be in one of the following positions:

an elevated position arranged to restrain movement of the one or more items from exiting through one of the side openings during transportation of the storage container to the unloading or loading station;

a lowered position arranged not to restrain movement of one or more items from exiting through one of the side openings at the unloading or loading station.

In one aspect, the lip is inclined or curved in a direction perpendicular to the first parallel side walls to allow product items to be pushed over the upwardly protruding member at the unloading or loading station.

In one aspect, the restraint comprises a friction increasing material for increasing friction between the one or more product items and the upper surface of the base.

In one aspect, the friction increasing material may be a coating deposited to parts of, or the entire, upper surface of the base. The coating may be stuck, printed, sprayed, painted or in other ways applied the upper surface of the base.

In one aspect, the friction increasing material may be a granular material deposited to parts of, or the entire, upper surface of the base.

In one aspect, the friction increasing material may be a filler material filled into a cavity provided in the upper surface of the base.

In one aspect, the friction increasing material may be integrated in the material of the upper surface of the base.

The friction increasing material may be provided during the manufacturing of the storage container, for example as part of a two-component injection molding process. Alternatively, the friction increasing material may be applied in a subsequent step after the manufacturing of the storage container.

In one aspect, the restraint comprises a profile provided in the upper surface of the base.

In one aspect, the profile provided in the upper surface of the base is made of the same material as the base itself.

In one aspect, the profile may comprise grooves, ridges, pedestals, steps, or other raised shapes or combination of such shapes.

In one aspect, the restraint comprises an elevatable floor movably connected to the storage container between:

a lower position, arranged to restrain movement of the one or more items from exiting through one of the side openings during transportation of the storage container to the unloading or loading station; and an upper position, arranged not to restrain movement of one or more items from exiting through one of the side openings at the unloading or loading station.

In one aspect, the elevatable floor comprises apertures and where the storage container comprises friction increasing members positioned in the apertures, where;

in the lower position, the elevatable floor is vertically aligned with, or lower than the friction increasing members;

in the upper position, the elevatable floor is higher than the friction increasing members.

In the above aspects, the elevatable floor is in the lower position during transportation to the unloading or loading station, while the elevatable floor is elevated to its upper position at the unloading or loading station. The opposite is also possible. In one such aspect, friction reducing members may be positioned in the apertures of the elevatable floor, while the elevatable floor itself may comprise a friction increasing material. Here, the elevatable floor is in the upper position during transportation to the unloading or loading station, while the elevatable floor is lowered to its lower position at the unloading or loading station.

In the lower position, the elevatable floor may be lower than the upwardly protruding lip and in the upper position, the elevatable floor may be vertically aligned with, or higher than the upwardly protruding lip.

In one aspect, the elevatable floor is tiltable to allow the one or more product items to slide out from the storage container.

In one aspect, the elevatable floor is movably connected to the base of the storage container by means of one or a plurality of legs, wherein the one or plurality of legs are accessible from below the storage container.

In one aspect, the elevatable floor is configured to be in the lower position due to gravity. Alternatively, the elevatable floor may be biased to be in the lover position, for example by means of a spring.

In one aspect, as the legs are accessible from below the storage container, an actuator may be used to move the elevatable floor from the lower position to the upper position. The actuator may be part of the storage container itself, for example integrated into the base. Alternatively, the actuator may be integrated in the container handling vehicle and/or the delivery vehicle. In yet an alternative, the actuator may be provided as part of the unloading or loading station.

In one aspect, the one or plurality of legs comprises a stop for limiting the vertical movement of the elevatable floor in relation to the base.

In one aspect, the top opening is configured to allow product items to be inserted into and/or retrieved from the storage container. Hence, product items may be loaded or unloaded also through this top opening.

In one aspect, the two first parallel side walls or the two second parallel side walls comprises an upper vehicle connection interface. The upper vehicle connection interface may be formed by one or more cut-outs or apertures into the upper area of these walls, into which a gripping device of a container handling vehicle or a lifting frame of an unloading station can be engaged.

In one aspect, the storage container is made of moulded plastic. In one aspect, the storage container comprises an array of moulded ribs, allowing the load of the product items carried by the base to be transferred into the side walls and further to the top of the side walls where the upper vehicle connection interface is provided The storage container further comprises lower and upper stacking interfaces for allowing the storage container to be stacked in a stack together with other storage containers. The lower and upper stacking interfaces are configured to prevent relative horizontal movement between two adjacent storage containers stacked above each other.

BRIEF DESCRIPTION OF THE DRAWINGS

The following drawings depict exemplary embodiments of the present invention and are appended to facilitate the understanding of the invention.

FIG. 2 A-C is a top view of a container handling vehicle rail system, where

FIG. 8a-h show the operation of a third embodiment.

FIGS. 10a, 10b and 10c show yet an alternative embodiment.

FIG. 11b shows the storage container in FIG. 11a cut along dashed line indicated by arrows A in FIG. 11a.

DETAILED DESCRIPTION OF THE INVENTION

Figure 1A:
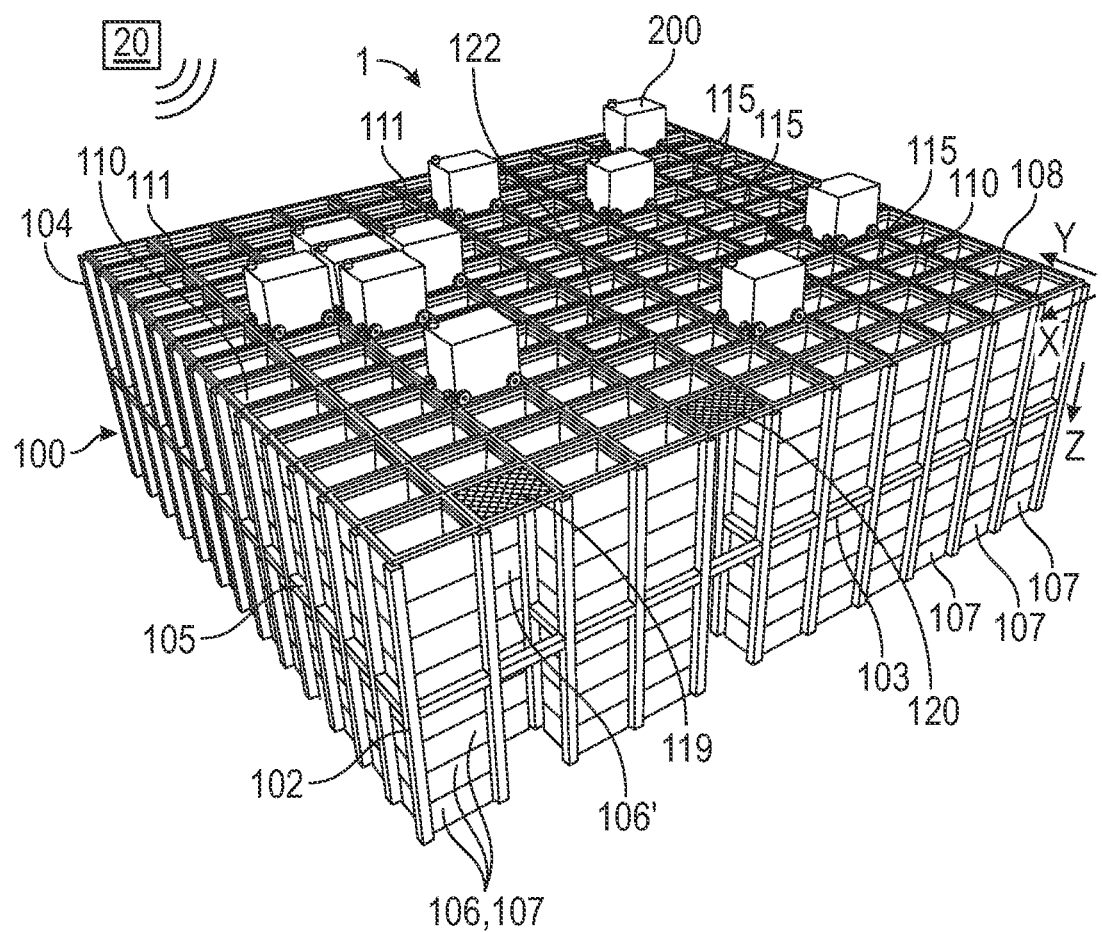
FIG. 1 A-D are perspectives view of a prior art automated storage and retrieval system, where FIG. 1A
FIG. 1C shows the complete system and FIG. 1B
FIG. 1D shows examples of system operable prior art container handling vehicles.
Figure 1B:
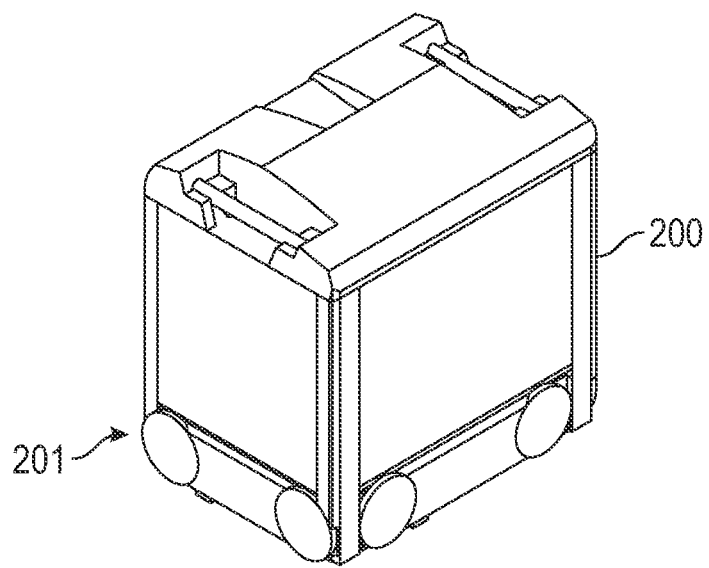

In the following, embodiments of the invention will be discussed in more detail with reference to the appended drawings.

With reference to FIGS. 1A-D the storage grid 104 of each storage structure 1 constitutes a framework 100 of in total 143 grid columns 112, where the width and length of the framework corresponds to the width and length of 13 and 11 grid columns 112, respectively. The top layer of the framework 100 is a rail system 108 onto which a plurality of container handling vehicles 200,300 are operated.

Figure 1C:
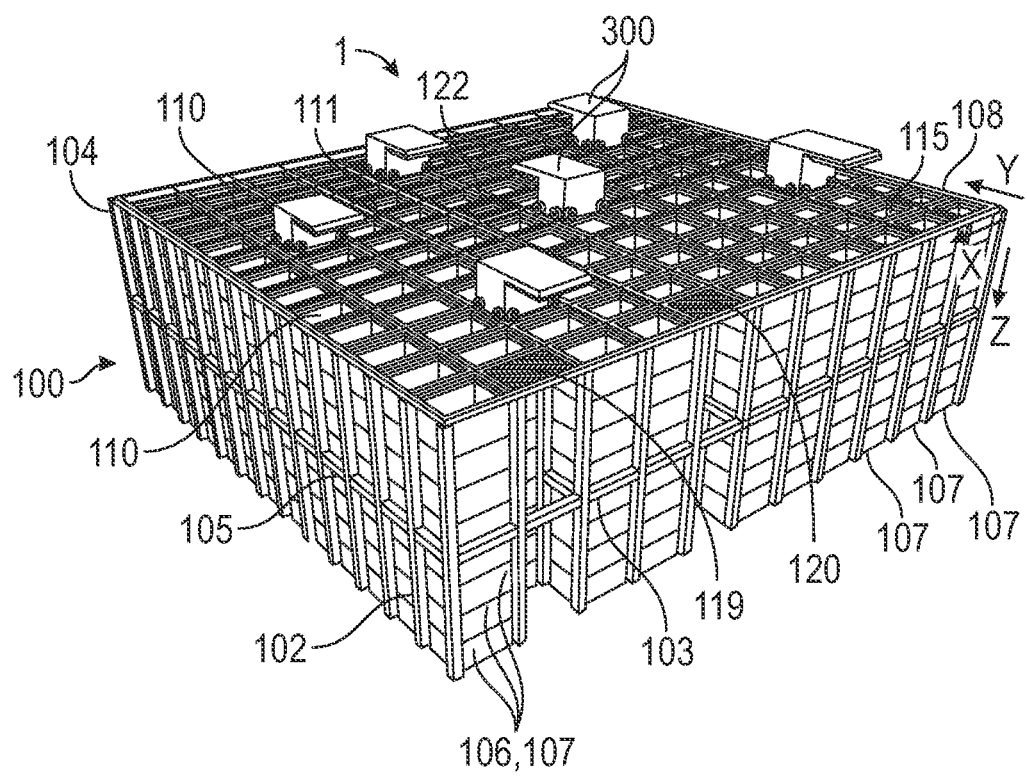
Figure 1D:
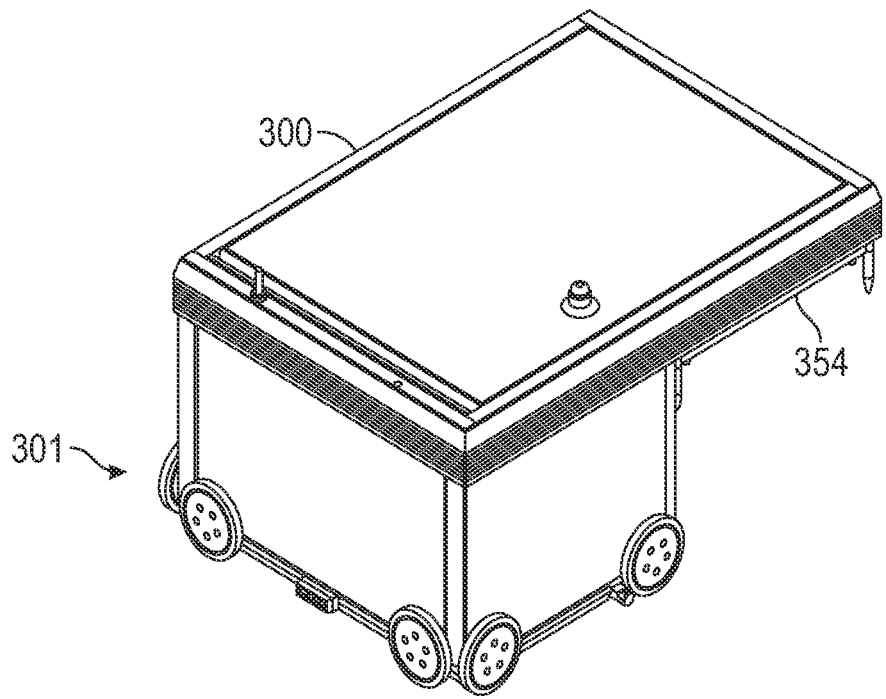

The framework 100 of the storage system 1 is constructed in accordance with the above mentioned prior art framework 100 described above, i.e. a plurality of upright members 102 and a plurality of horizontal members 103 which are supported by the upright members 102, and further that the horizontal members 103 includes a container handling vehicle rail system 108 of parallel rails 110,111 in the X direction and the Y direction, respectively, arranged across the top of storage columns 105. The horizontal area of a single grid cell 122, i.e. along the X and Y directions, may be defined by the distance between adjacent rails 110 and 111, respectively (see also FIG. 2). In FIGS. 1A and 1C, such a grid cell 122 is marked on the rail system 108 by thick lines.

The container handling vehicle rail system 108 allows the container handling vehicles 200,300 to move horizontally between different grid locations, where each grid location is associated with a grid cell 122.

In FIGS. 1A and 1C the storage grid 104 is shown with a height of eight cells. It is understood, however, that the storage grid 104 can in principle be of any size. In particular it is understood that storage grid 104 can be considerably wider and/or longer than disclosed in FIGS. 1A and 1C. For example, the grid 104 may have a horizontal extent of more than 700×700 grid cells 122. Also, the grid 104 can be considerably deeper than disclosed in FIGS. 1A and 1C. For example, the storage grid 104 may be more than twelve grid cells deep.

The storage container vehicles 200,300 may be of any type known in the art, e.g. any one of the automated container handling vehicles disclosed in WO2014/090684 A1, in NO317366 or in WO2015/193278A1.

Figure 2A:
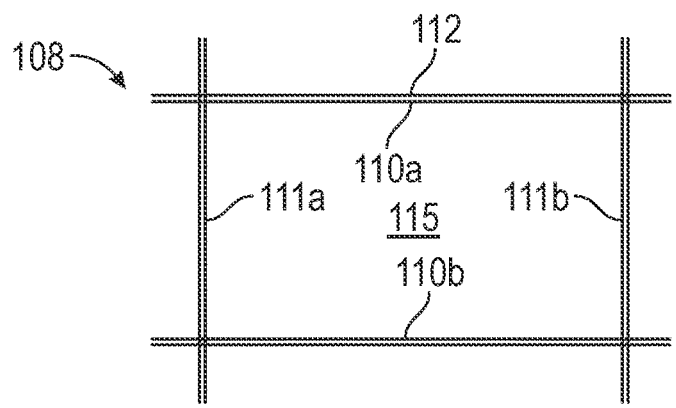
FIG. 2A shows a single track system.
Figure 2B:
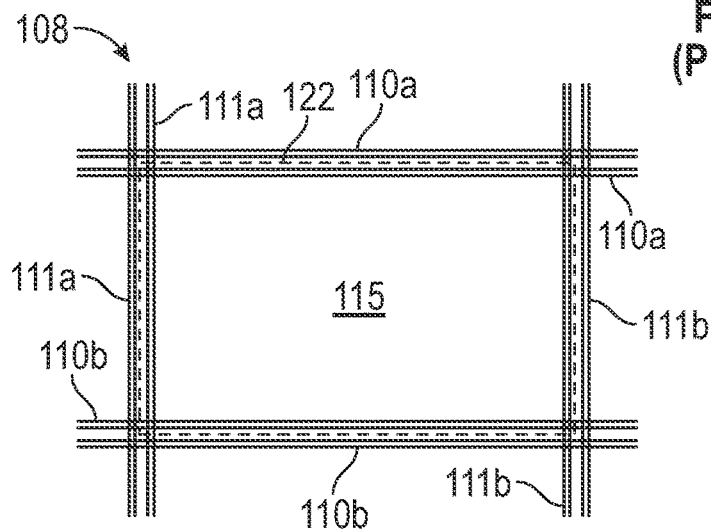
FIG. 2B shows a double track system 213 and FIG. 2C shows a double track system indicated width and length of a container handling vehicle grid cell.
Figure 2C:
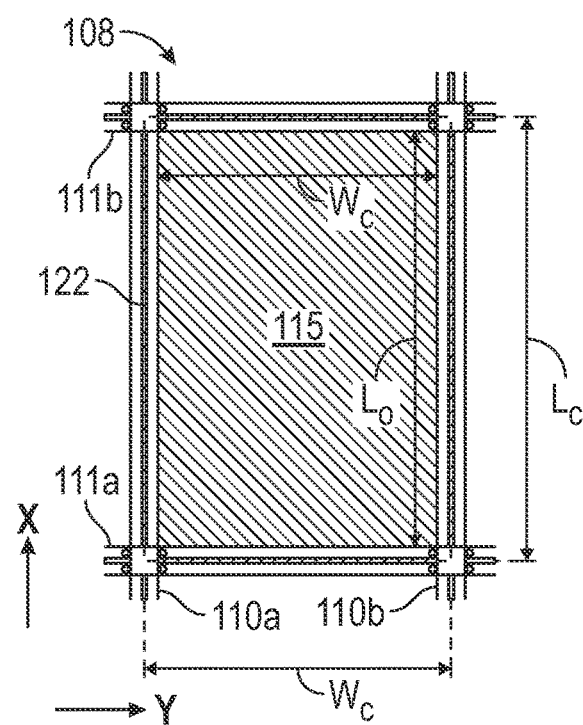

The rail system 108 may be a single track system, as is shown in FIG. 2A, a double track system, as is shown in FIG. 2B, or a combination of the single and double track systems. Details of the various track systems are disclosed this specification under the section of background and prior art.

In FIG. 1A, a control system of the automated storage and retrieval system 1 is shown as a box 20 provided in communication with the vehicles 200, 300.

First Embodiment (Unloading Station)

Figure 3:
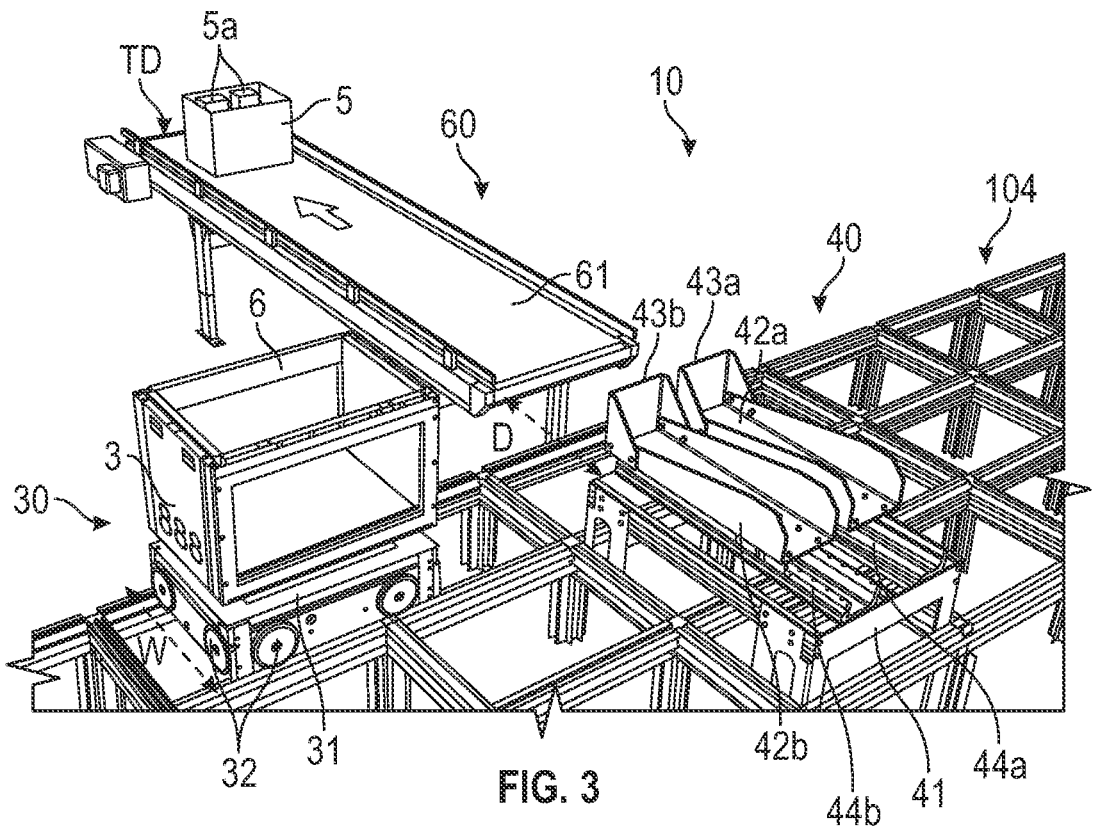
FIGS. 3 and 4 are perspective views of a first embodiment of the present invention—in FIG. 3 the container is carried by a delivery vehicle while in FIG. 4 the container is shown isolated from the delivery vehicle.
Figure 4:
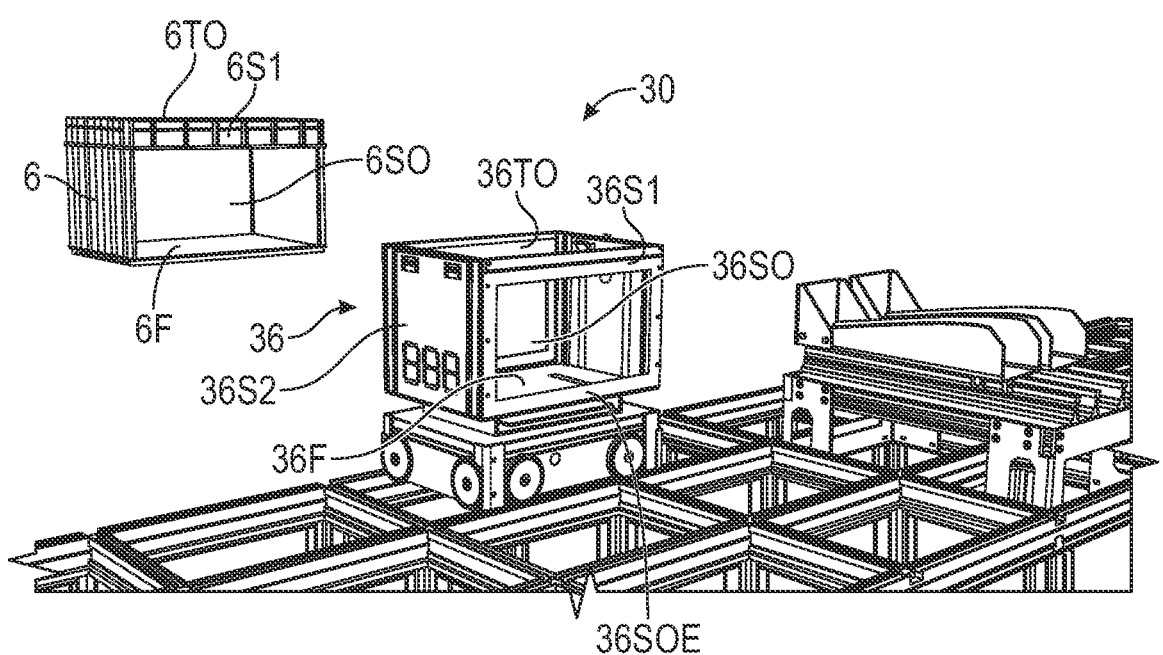

It is now referred to FIGS. 3 and 4. Here, it is shown an unloading station 10 for an automated storage and retrieval system 1.

The unloading station 10 comprises an unloading device generally indicated with arrow 40 and a destination conveyor generally indicated with arrow 60.

It is also shown a remotely operated vehicle in the form of a delivery vehicle 30. The delivery vehicle 30 comprises a vehicle body 31 and a wheel arrangement 32 connected to the vehicle body 31. The wheel arrangement 32 is configured to move the remotely operated vehicle 30 along the rail system 108 of the automated storage and retrieval system 1 or along a corresponding rail system 108 located below or adjacent to the grid 104. The wheel arrangement 32 is considered to be prior art and will not be described further in detail herein.

The delivery vehicle 30 comprises a container carrier 36 located above the wheel arrangement 32. It should be noted that the delivery vehicle in the present embodiment is different from the above vehicles 200, 300 in that the vehicle 30 itself does not comprise a lifting device for lowering and elevating a storage container with respect to the grid 104. In the present embodiment, the vehicle 30 is of a type adapted to receive a storage container 6 from above or to return a storage container 6 upwardly by means of a separate lifting device. The lifting device used for this operation can for example be a lifting device of the prior art vehicles 200, 300, provided that the vehicle 30 is located below one of the vehicles 200, 300. Another example of such a lifting device will also be described further in detail below.

In the present embodiment, the container carrier 36 comprises two first parallel side walls 36S1 each having a side opening 36SO and two second parallel side walls 36S2 perpendicular to the first side walls 36S1. The two second sidewalls 36S2 do not have side openings. In addition, the container carrier comprises a floor 36F and a top opening 36TO for receiving and delivering a storage container 6. In the present embodiment, a lower edge 36SOE of the side opening 36SO is horizontally aligned with the floor 6F of the storage container 6 when the storage container 6 is provided in the container carrier 36.

The storage container 6 is here similar to the prior art storage containers 106 described above, with one difference—the storage container 6 comprises two side openings 6SO in its two first parallel side walls 6S1. As shown in FIG. 4, the storage container has a floor 6F and a top opening 6TO.

The unloading device 40 will now be described. The unloading device 40 comprises a base structure 41 which may be fixed to grid 104 or to the rail system 108. The unloading device 40 further comprises a first unloading member 42a having a first contact surface 43a and a second unloading member 42b having a second contact surface 43b. The contact surfaces 43a, 43b are adapted to the item 5. For the planar cardboard box in FIG. 3, the contact surfaces 43a, 43b are planar.

The unloading device 40 further comprises a first actuator 44a configured to move the first unloading member 42a in relation to the base structure 41 and a second actuator 44b configured to move the second unloading member 42b in relation to the base structure 41.

In addition, the unloading device 40 comprises a control system for controlling the first and/or second actuator 44a, 44b. This control system may be the control system 20 of the automated storage and retrieval system 1 shown in FIG. 1, which is also controlling the movement of the vehicles with respect to the unloading device 40.

It should be noted that there can be one such unloading member 42 or there can be three or more such unloading members 42. In an automated storage and retrieval system 1, there may be several such unloading stations 10, where some unloading stations 10 have one unloading member 42 to be used for larger items 5, while other unloading stations 10 have several unloading members 42 to be used for smaller items 5. Moreover, the contact surface 43 of some unloading members 42 may be designed for one specific type of item 41.

It should also be noted that the unloading members 42a, 42h of FIG. 3 may be moved in parallel when unloading larger items and may be moved one by one when unloading smaller items.

The purpose of the unloading device 40 is to move an item 5 stored in the storage container 6 through the side opening 36SO of the container carrier 36 and through the side opening 6SO of the storage container 6 and further to the destination conveyor 60. As the lower edge 36SOE of the side opening 36SO is horizontally aligned with the floor 6F of the storage container 6 when the storage container 6 is provided in the container carrier 36, the item 5 can easily be pushed out through the side openings 6SO and 36SO.

In the first embodiment, the first and second actuators 44a. 44h are linear actuators moving the unloading members 42a, 42b linearly. The linear movement may be in the horizontal plane.

The destination conveyor 60 will now be described. The destination conveyor 60 here comprises a belt conveyor 61 which in one ends receives an item 5 and conveys it to its second end, which hereinafter is referred to as a target destination TI).

In FIG. 3, an item 5 in the form of a shipping package containing two product items 5a is shown at the target destination TD. Here, before arrival to the unloading station 10, product items 5a have been picked from storage containers 106 stored in the grid 104 into the shipping package 5 provided in the storage container 6, which then has been transferred to the unloading station 10 by means of the vehicle 30 for unloading of the shipping package to the destination conveyor 60.

It should be noted that the shipping package 5 here is a cardboard box which is one example of a shipping package which may be used to ship product items 5a. Other examples of such shipping packages are boxes or bags made of plastic or paper, lined envelopes etc. The unloading station 10 can be used independent of how the product items were picked into the shipping packages, the picking operation may be an automated picking process or a manual picking process. Hence, in some cases, no picking operation takes place before the storage container 6 is moved to the unloading station.

Figure 5:
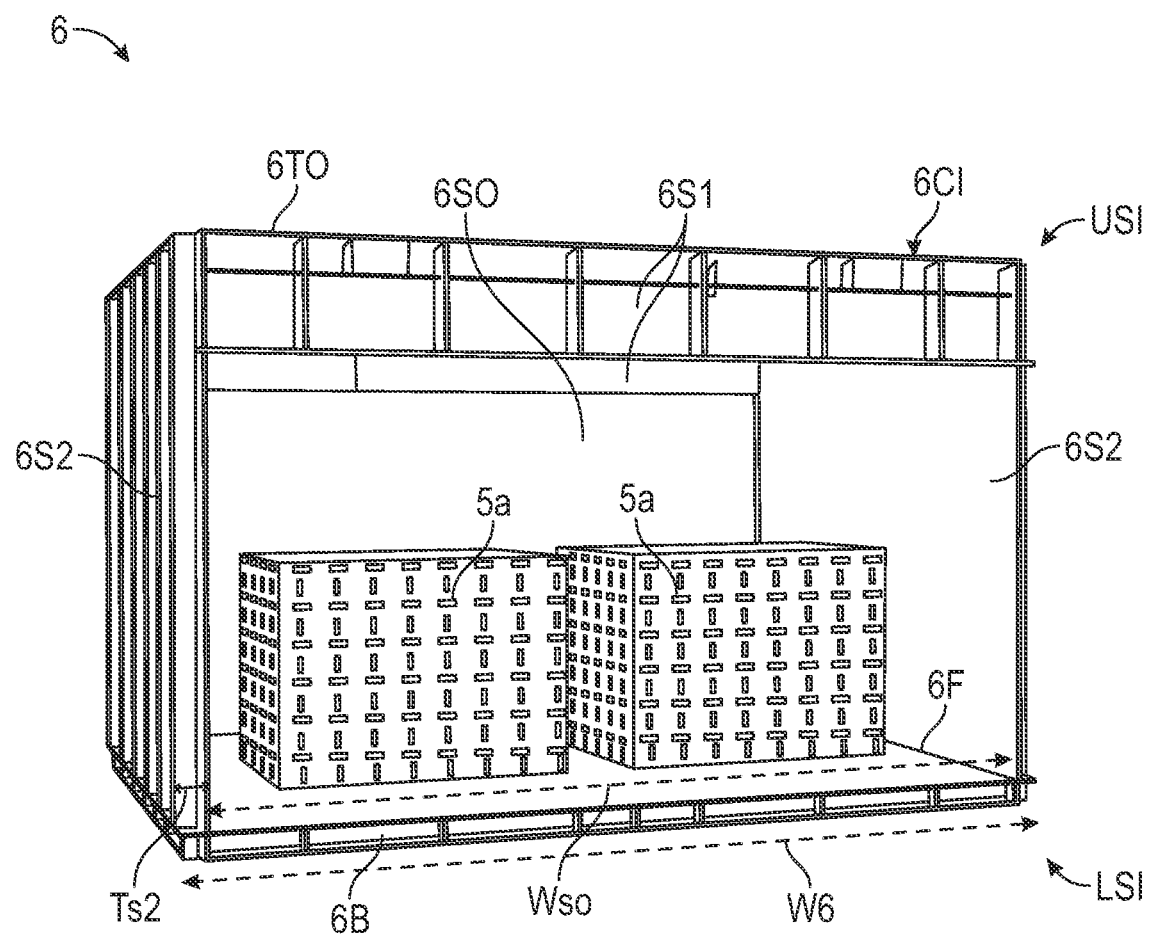
FIG. 5 is an enlarged view of the container containing two shipping packages.

It should also be mentioned that some product items 5a do not need a further shipping package 5 before shipping. One such example is shown in FIG. 5. Here, two product items 5a have been prepackaged into respective shipping packages and stored in a storage container 6 and/or storage container 106 before arrival into the automated storage and retrieval system. Here, the product items 5a may be unloaded directly from the storage container 6 to the destination conveyor. Hence, the term "item" is here referring to both product items 5a and shipping packages 5 containing one or several such product items 5a.

Is should be noted that the destination conveyor 60 may comprise a roller conveyor or other types of conveying means for conveying the item to the target destination TD. Moreover, it should be noted that the target destination TD is the target destination of the unloading station 10. The item 5 may be transferred to further destinations, for example a station where the shipping packages are closed, addressed and/or prepared for dispatch by postal services or delivery services, to pickup points etc.

In FIG. 3, the distance D between the contact surfaces 43a, 43b in their deactivated position and the destination conveyor 60 is slightly larger than the width W of the vehicle 30, thereby allowing the vehicle 30 to move between the destination conveyor 60 and the unloading device 40 while at the same time helping to avoid items 5 being able to fall onto the floor below the unloading station 10.

In addition, the height of the belt conveyor 61 is aligned with the height of the floor 6F of the storage container 6.

Figure 6A:
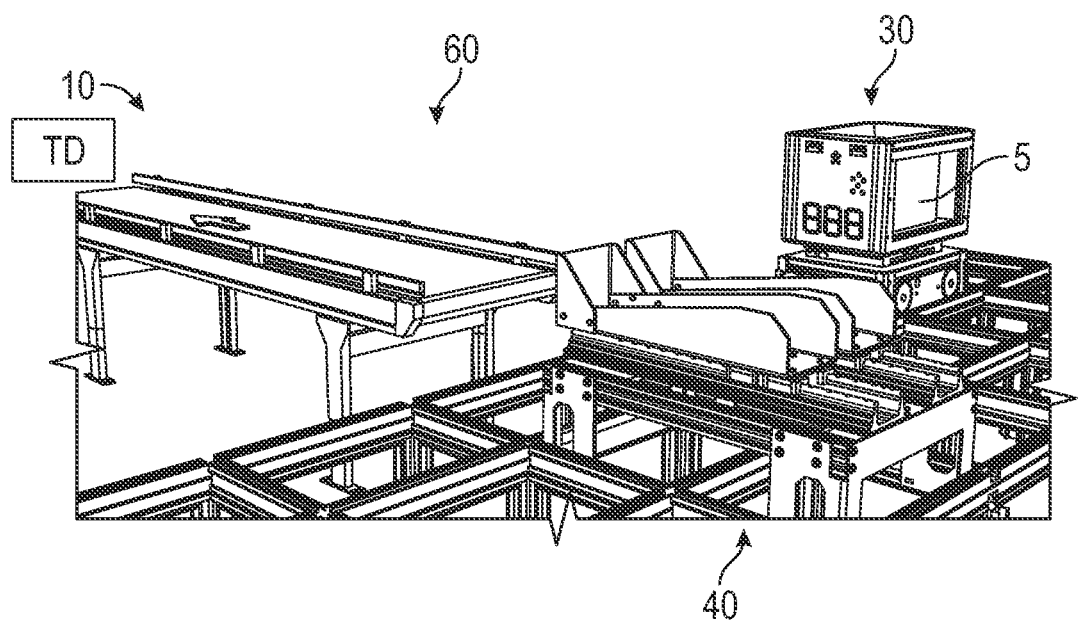
FIG. 6a-d show the operation of the first embodiment.

The operation of the unloading station 10 will now be described. In FIG. 6a, the vehicle 30 with a storage container 6 containing one item 5 is controlled by the control system 20 to move to the unloading station 10.

Figure 6B:
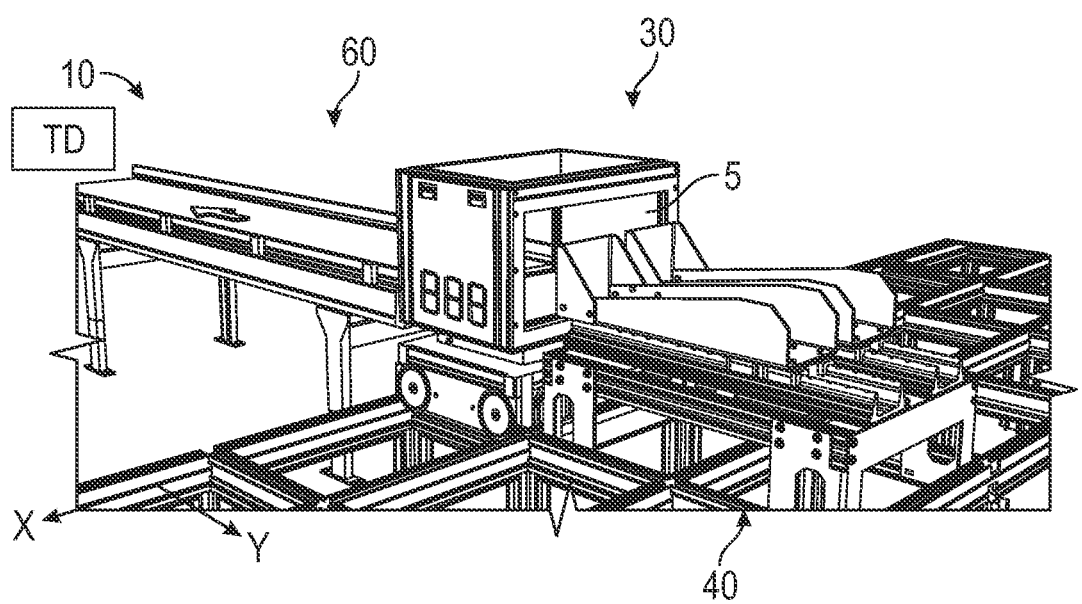

In FIG. 6b, the vehicle 30 has stopped at an unloading position between the destination conveyor 60 and the unloading device 40.

Figure 6C:
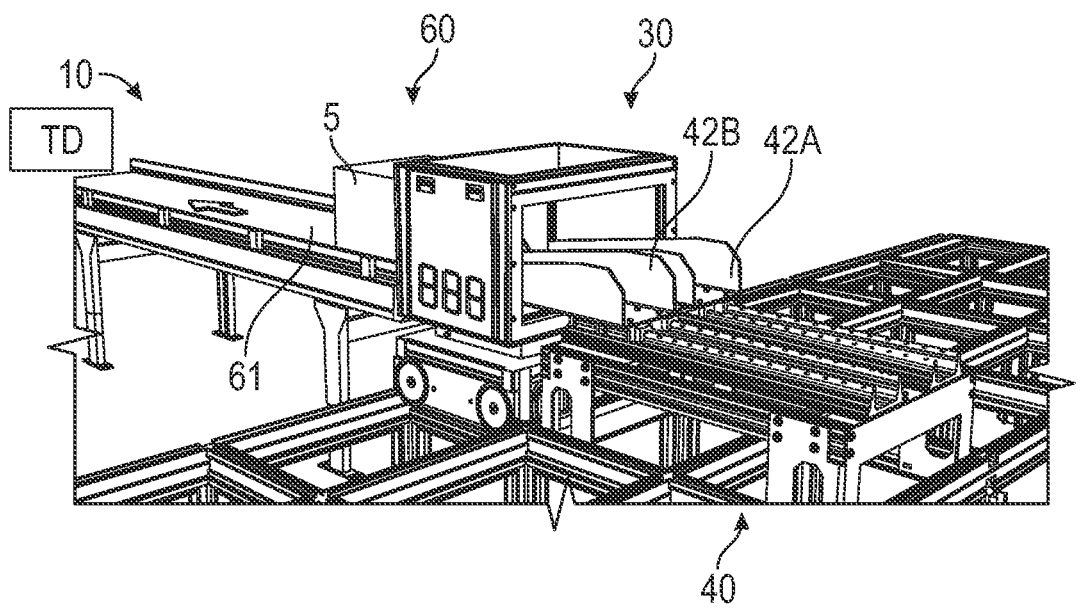

In FIG. 6c, the unloading members 42a, 42b have moved linearly in parallel into the side openings 36SO and 6SO, thereby pushing the item 5 out from the storage container 6 and the container carrier 36 and onto the belt conveyor 61.

Figure 6D:
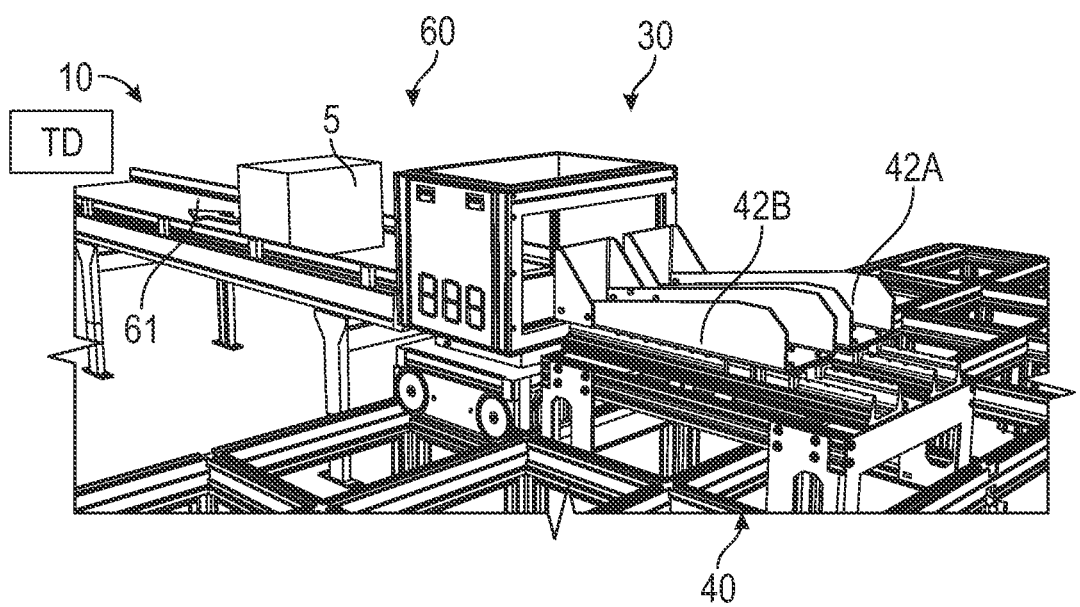

In FIG. 6d, the unloading members 42a, 42b have moved back to its initial position while the conveyor belt is moving the item 5 towards its target destination TD.

Then, in a final step shown in FIG. 3, the vehicle 30 is moving away from the unloading station 10 and the item 5 has reached its target destination TD.

One advantage of the unloading station 10 of the first embodiment described above is that it is relatively simple. One small disadvantage with the first embodiment may be that there is a risk that items 5 may slide out through the side openings 6SO, 36SO during acceleration and deceleration, in particular in the Y-direction shown in FIG. 6b. This can be avoided by keeping the acceleration and deceleration of the vehicle 30 relatively low. Another way of overcoming this advantage is to provide the floor 6F of the storage container 6 with a material which increases the friction between the floor 6F and the items 5. The second embodiment described below provides yet an alternative solution to this disadvantage.

Second Embodiment (Unloading Station)

Figure 7A:
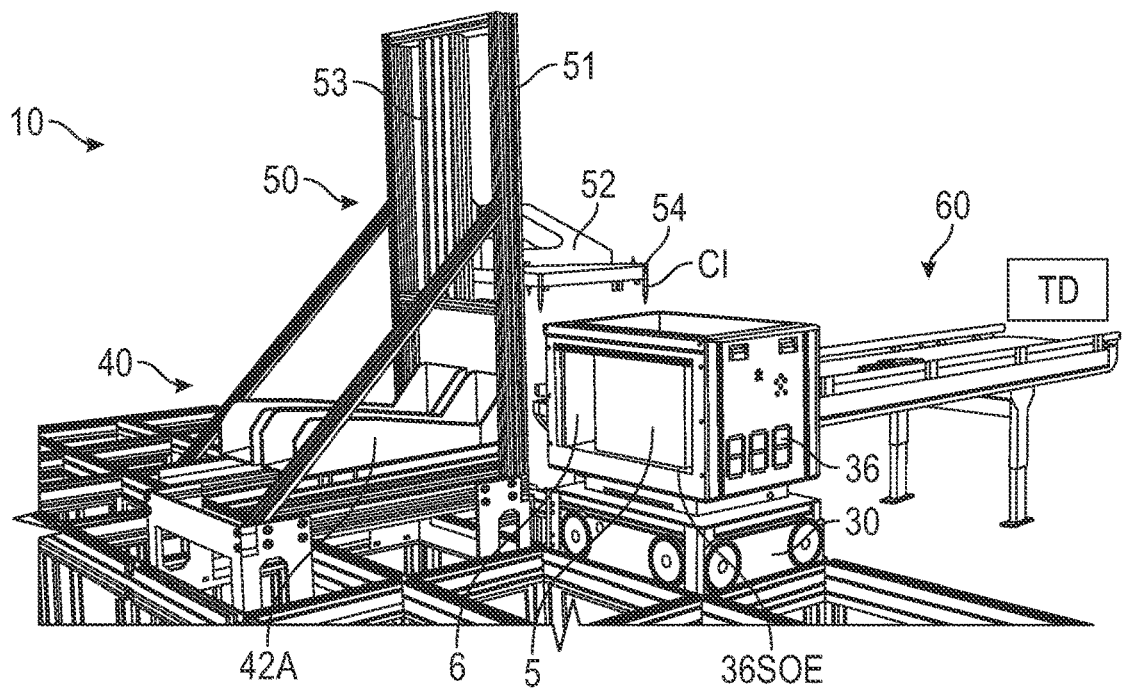
FIG. 7a-g show the operation of a second embodiment.
Figure 7B:
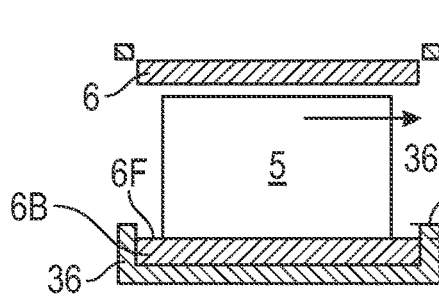
Figure 7C:
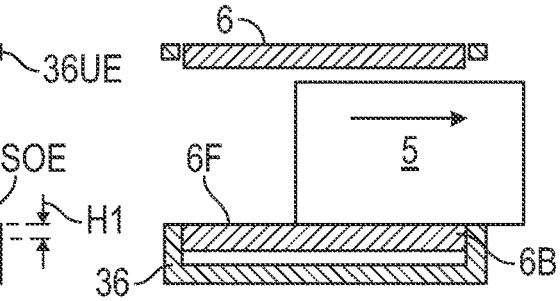

It is now referred to FIGS. 7a, 7b and 7c. The unloading station 10 is here similar to the unloading station 10 of the first embodiment, and only the differences will be described herein in detail.

In the present embodiment, the lower edge 36SOE of the side opening 36SO is not horizontally aligned with the floor 6F of the storage container 6 when the storage container 6 is provided in the container carrier 36. Instead, the lower edge 36SOE of the side opening 36SO is provided at a height H1 above the floor 6F of the storage container 6, as shown in FIG. 7b. In this way, if the item 5 provided in the storage container 6 are sliding due to acceleration and deceleration of the vehicle 30, the lower edge 36SOE will prevent the item 5 from sliding further out through of the side opening 36SO of the container carrier 36. Thus, another object of the invention is solved in that it is avoided that product items fall out of the container during shipping or transportation of the container. In the present embodiment, the unloading station 10 comprises a container lifting device 50 for lifting of the storage container 6 up from the vehicle 30. As shown in FIG. 7c, the lifting height of the storage container 6 corresponds to the height H1, i.e. the container lifting device 50 is configured to lift the storage container 6 till a height where the floor 6F of the storage container 6 is horizontally aligned with the lower edge 36SOE of the side opening 36SO. In the lifted position shown in FIG. 7c, the item 5 can be easily pushed out through the side openings 6SO and 36SO by means of the unloading device 40.

In FIG. 7a, it is shown that the container lifting device 50 comprises a first frame structure 51 fixed to the base structure 41 of the unloading device 40 and protruding upwardly with respect to the grid 104. It should be noted that in an alternative embodiment, the first frame structure 51 could be fixed to the grid 104 or to another fixed structure close to the unloading device 40.

The container lifting device 50 comprises a container lifting frame 54 with a connection interface CI for connection to and disconnection from the storage container 6. In the present embodiment, the container lifting frame 54 is of the same type of the container lifting frame 354 of container handling vehicle 300 shown in FIG. 1D. The container lifting frame 54 is fixed below a second frame structure 52, where the second frame structure 52 is movable up and down in relation to the first frame structure 51 by means of a lifting mechanism 53. The lifting mechanism 53 may be an electric motor, a linear electric or electrohydraulic actuator etc.

In the present embodiment, the height of the unloading members 42a, 42b above the grid 104 may be adapted to the height of the lower edge 36SOE of the side opening 36SO by increasing the height of the base structure 41. Also, the height of the destination conveyor 60 may be adapted to the height of the lower edge 36SOE.

The operation of the unloading station 10 will now be described. In FIG. 7a, the vehicle 30 with a storage container 6 containing one item 5 is controlled by the control system 20 to move to the unloading station 10.

Figure 7D:
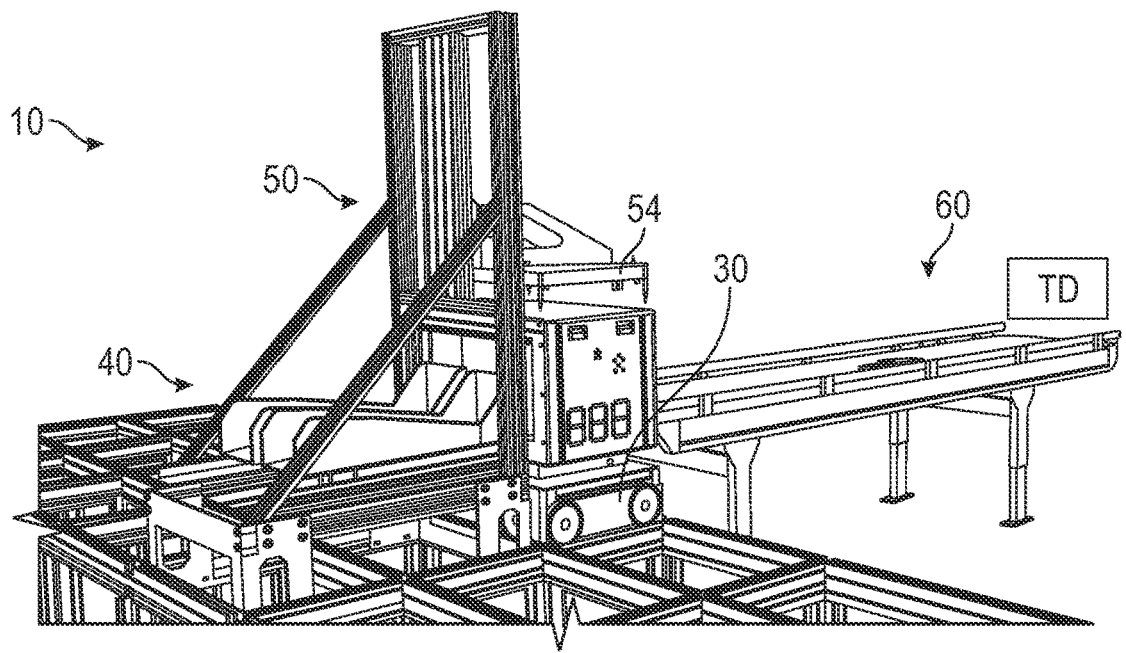

In FIG. 7d, the vehicle 30 has stopped at an unloading position between the destination conveyor 60 and the unloading device 40. The lifting frame 54 is here in an elevated position.

Figure 7E:
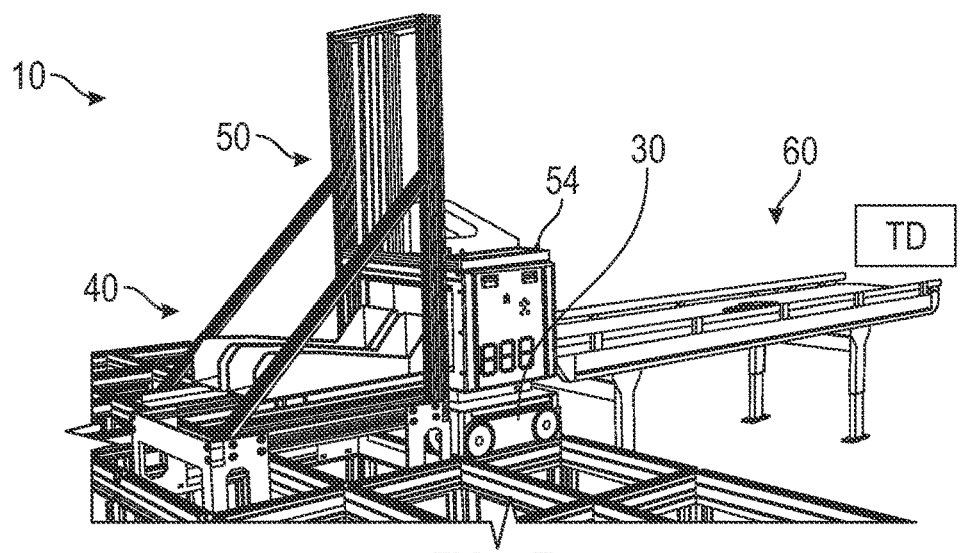

In FIG. 7e, the lifting frame 54 has been to and the connection interface CI is connected to the storage container 6.

Figure 7F:
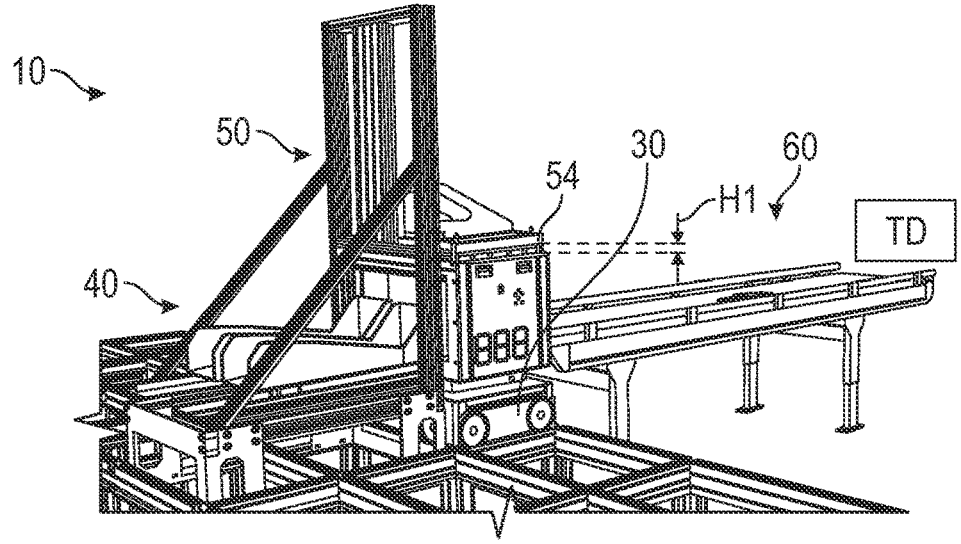

In FIG. 7f, the lifting frame 54 has lifted the storage container upwardly a height H1, corresponding to FIG. 7c.

Figure 7G:
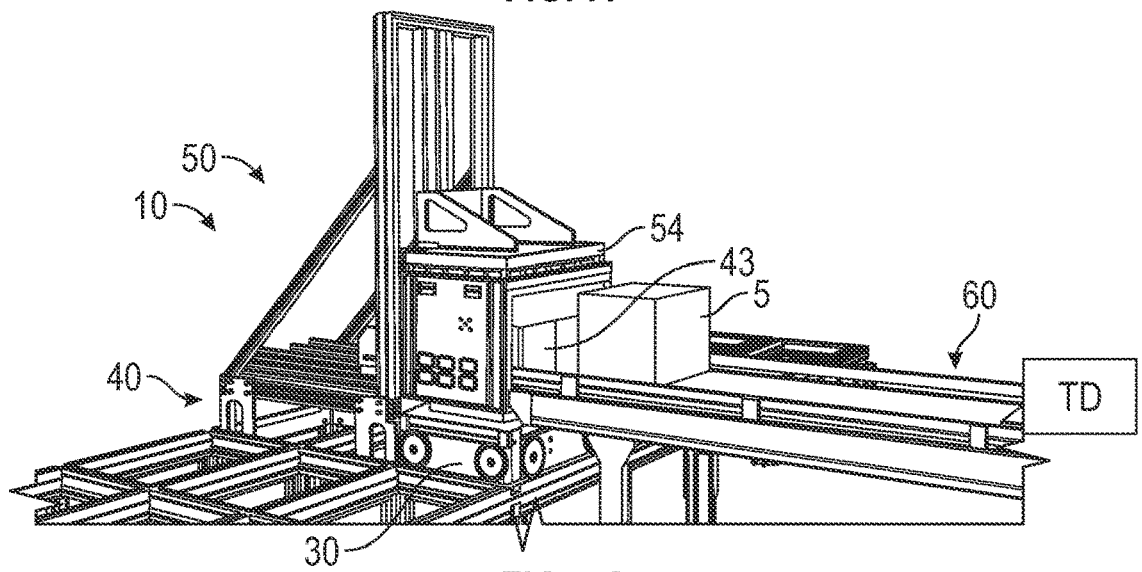

In FIG. 7g, the unloading members 42a, 42b have moved linearly in parallel into the side openings 36SO and 6SO, thereby pushing the item 5 out from the storage container 6 and the container carrier 36 and onto the belt conveyor 61.

When the item 5 has been pushed out and onto the destination conveyor 60, the unloading members 42a, 42b will return to their initial position, the lifting frame 54 will be lowered and the connection interface CI will be disconnected from the storage container 6. After elevating the lifting frame 54 without the storage container 6, the vehicle 30 may move away from the unloading station 10. As described above, the destination conveyor 60 will move the item 5 to its target destination TD.

Third Embodiment (Unloading Station)

It is now referred to FIGS. 8a, 8b and 8c. The unloading station 10 is here similar to the unloading station 10 of the second embodiment, and only the differences will be described herein in detail.

In the present embodiment, the container carrier 36 of the vehicle 30 is not provided with openings. Here, the storage container 6 is lifted to a height H2 as indicated in FIG. 8b and FIG. 8f by means of the container lifting device 50, in order to horizontally align the floor 6F of the storage container 6 with an upper edge 36UE of the container carrier 36, as shown in FIG. 8c. In this way, if the item 5 provided in the storage container 6 are sliding due to acceleration and deceleration of the vehicle 30, the item 5 will not fall out of the storage container 6 as there are no side openings in the container carrier 36.

In the present embodiment, the height of the unloading members 42a, 42b above the grid 104 are adapted to the height of the upper edge 36UE by increasing the height of the base structure 41. Also the height of the first frame structure 51 and the second frame structure 52 are changed due to the different lifting height H2 of the present embodiment. Also the height of the destination conveyor 60 has been adapted to the height of the upper edge 36UE.

The operation of the unloading station 10 will now be described. In FIG. 8a, the vehicle 30 with a storage container 6 containing one item 5 is controlled by the control system 20 to move to the unloading station 10.

Figure 8D:
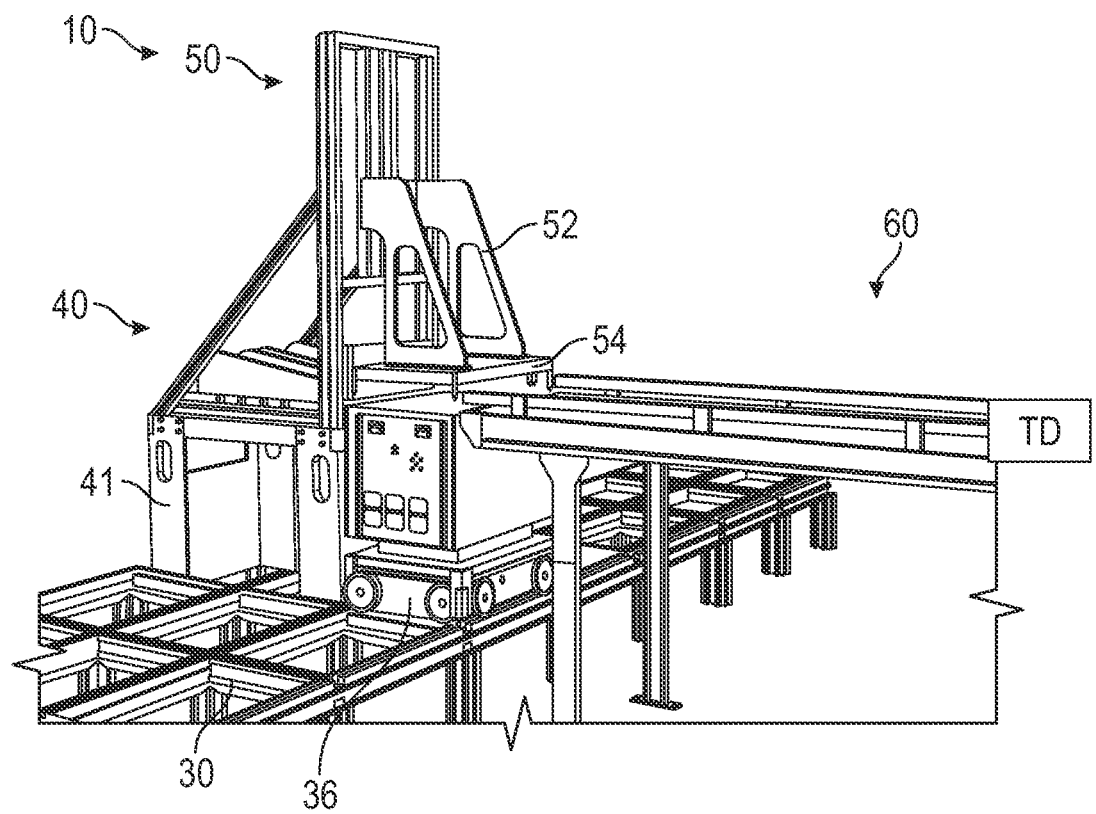

In FIG. 8d, the vehicle 30 has stopped at an unloading position between the destination conveyor 60 and the unloading device 40. The lifting frame 54 is here in an elevated position.

Figure 8E:
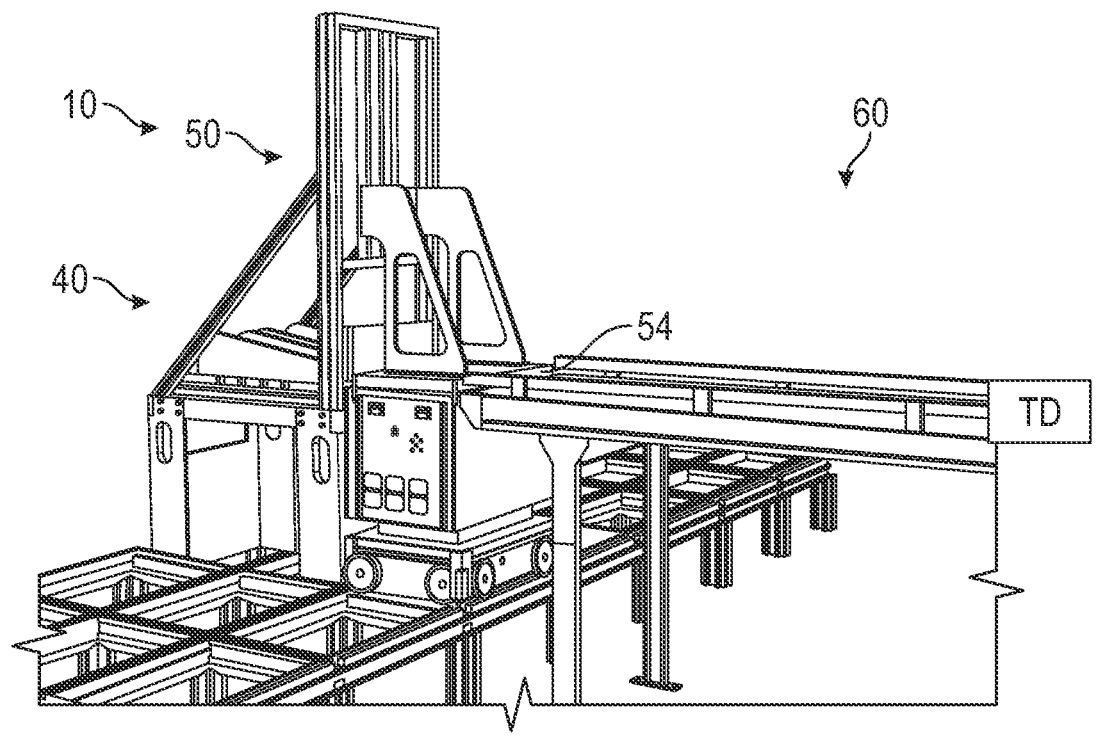
Figure 8F:
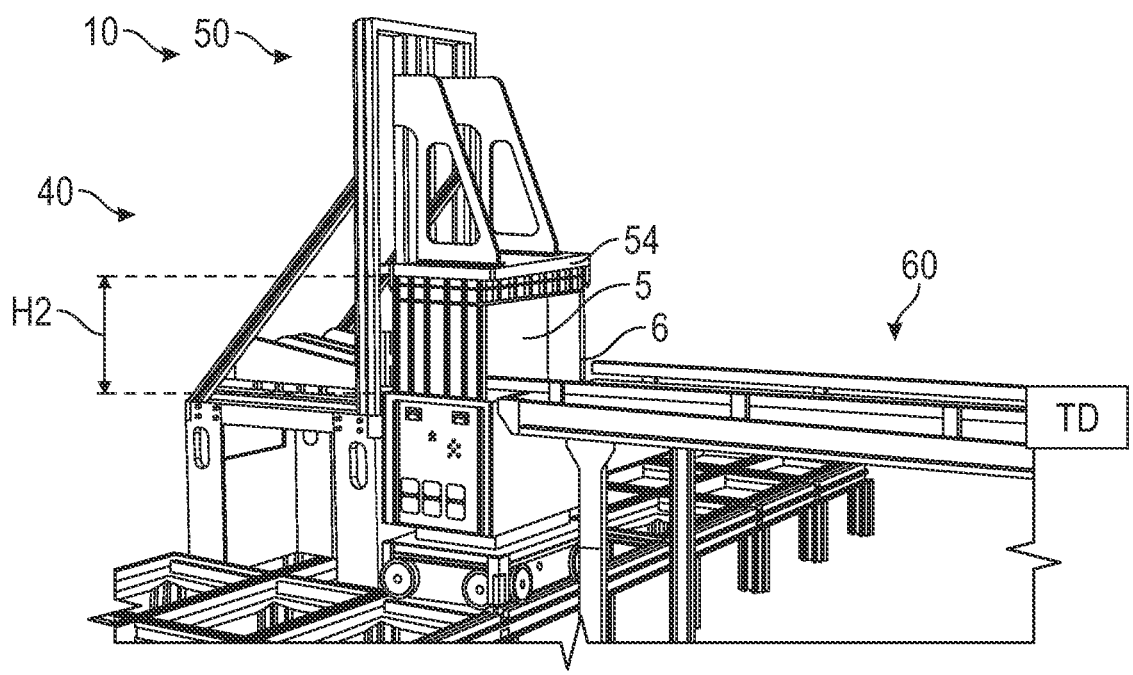

In FIG. 8e, the lifting frame 54 has been lowered and the connection interface CI is connected to the storage container 6.

In FIG. 8f, the lifting frame 54 has lifted the storage container upwardly a height H2, corresponding to FIG. 7c.

Figure 8G:
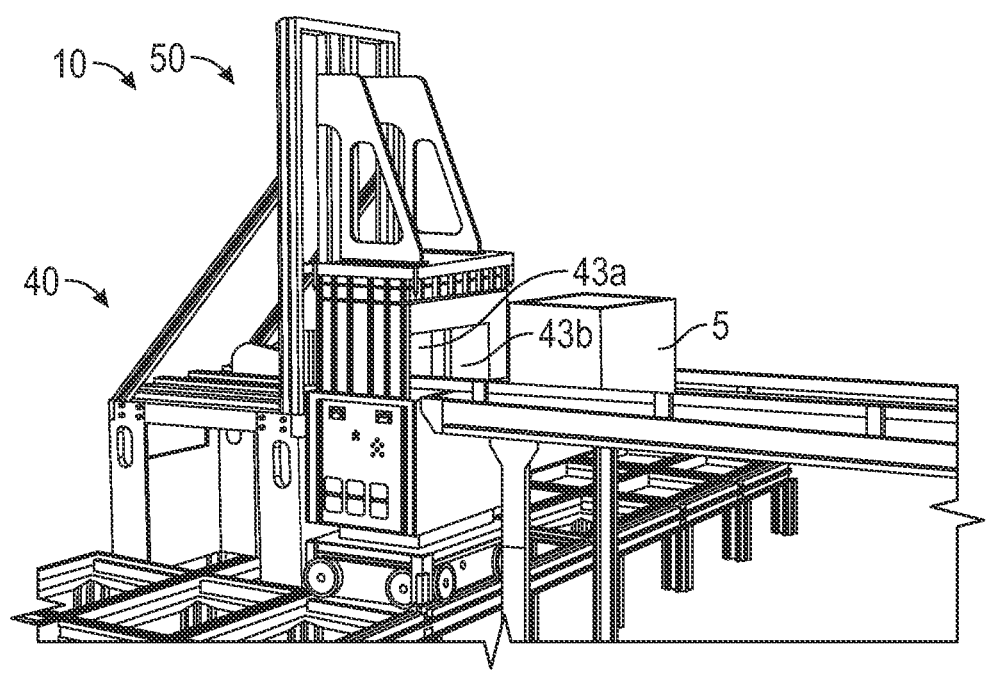

In FIG. 8g, the unloading members 42a, 42b have moved linearly in parallel into the side opening 6SO, thereby pushing the item 5 out from the storage container 6 and onto the belt conveyor 61.

Figure 8H:
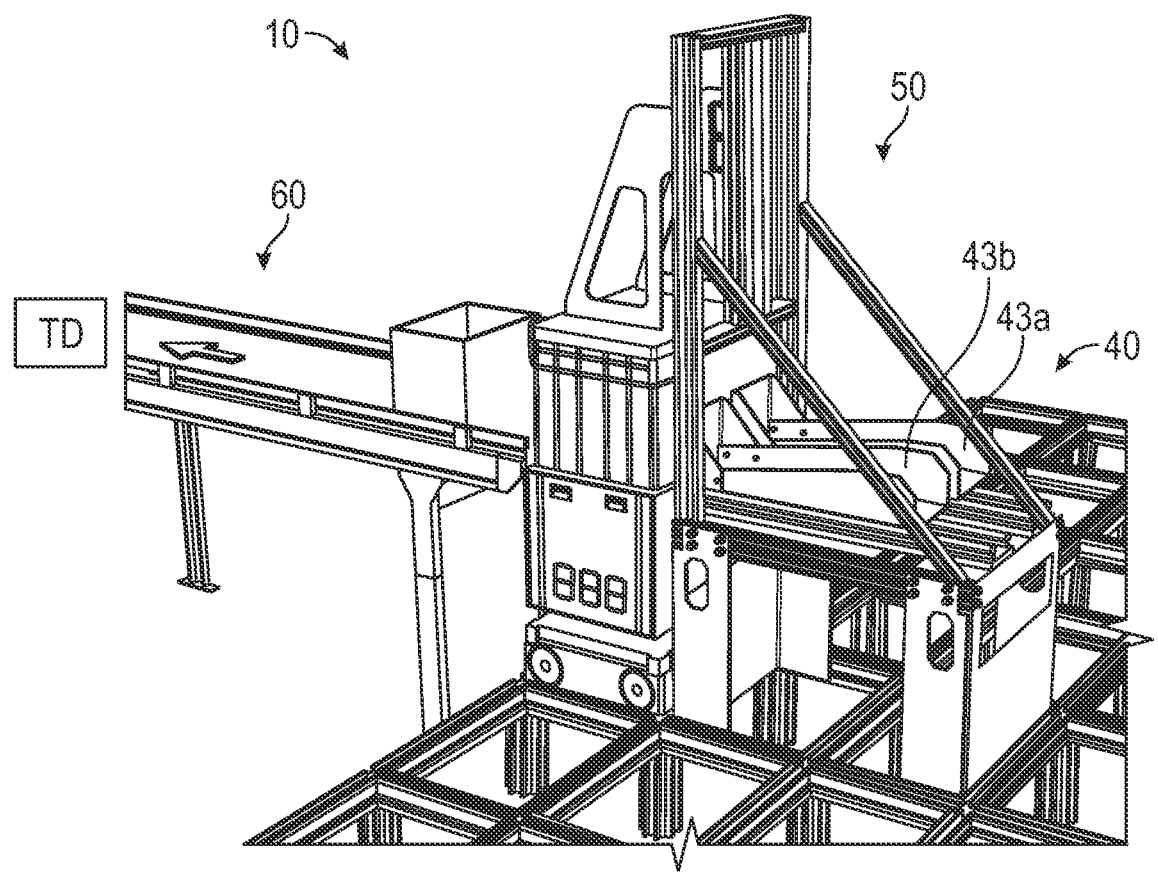

In FIG. 8h, the unloading members 42a, 42b have returned to their initial position.

Later, lifting frame 54 will be lowered and the connection interface CI will be disconnected from the storage container 6. After elevating the lifting frame 54 without the storage container 6, the vehicle 30 may move away from the unloading station 10. As described above, the destination conveyor 60 will move the item 5 to its target destination TD.

Fourth Embodiment (Unloading Station)

Figures 9A, 9B:
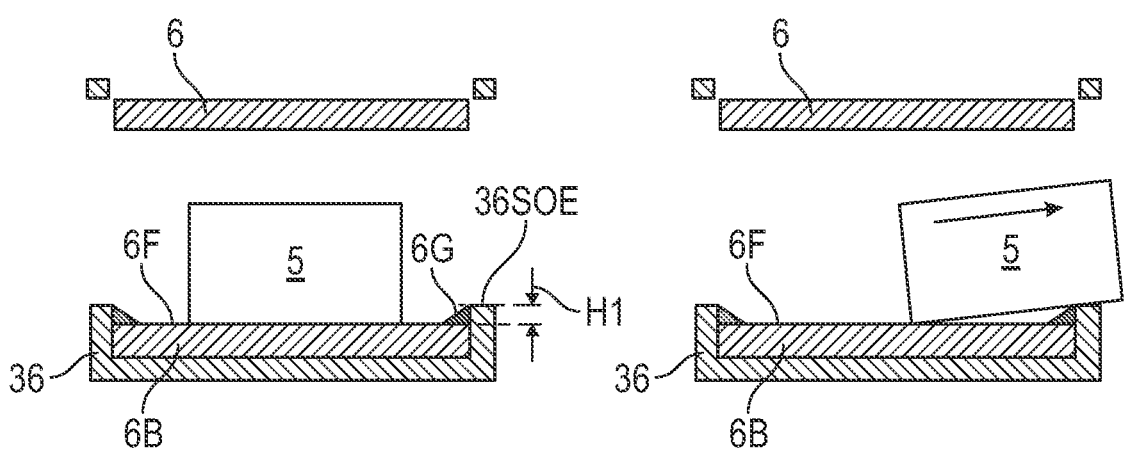
FIGS. 9a and 9b show an alternative embodiment.

It is now referred to FIGS. 9a and 9b. This embodiment corresponds to the first embodiment, i.e. the unloading station 10 does not comprise a container lifting device 50. However, the floor 6F is here provided at a height H1 below the lower edge 36SOE of the side opening 36SO of the container carrier 36, as in the second embodiment.

Here, the storage container 6 comprises an inclined member 6G provided between the floor 6F and the lower edge 36SOE, allowing the item 5 to be pushed by means of the unloading members 42a, 42b along the floor 6F and upwardly along the inclined member 6G and further out of the side opening 36SO, as shown in FIG. 9b.

The embodiments described in relation to the Figures solve at least some of the objectives, including that product items and shipping packages are handled with care—i.e. they are not damaged during the unloading of the container.

Fifth Embodiment (Unloading Station)

It is now referred to FIG. 10a. Here, the unloading device 40 does not comprise a container lifting device 50 or unloading members 42. Here, the unloading device 40 is provided as a tilting or pivoting device 48 mounted between the vehicle body 31 and the container carrier 36. In FIG. 10, it is shown that the container carrier 36 can be tilted with a tilting angle TA with respect to horizontal plane. The tilting angle IA can for example be up to 60°. This will cause the item 5 to slide out from the container 6 and the container carrier 36 and onto the belt conveyor 61.

In FIG. 10b, the container carder 36 is similar to the one in FIG. 3, where the lower edge 36SOE of the side opening 36SO is aligned with the floor 6F of the storage container 6 when the storage container 6 is provided in the container carrier 36.

In FIG. 10c, the container carrier 36 is similar to the one in FIG. 9b, i.e. with an inclined member 6G provided between the floor 6F and the lower edge 36SOE.

It should be noted that in this and other embodiments above, the container floor 6F may be manufactured of or may be equipped with a material providing a desired friction with respect to the item 5, to enable that the item slides out from the container 6 and the container carrier 36 at the desired location only.

It should also be noted that the unloading device 40 may comprise a combination of the fifth embodiment and the first embodiment, i.e. having both a tilting or pivoting device 48 provided on the vehicle 30 and one or more reciprocating unloading members 42.

The Storage Container—First Embodiment

In the description above, the unloading station 10, the unloading device 40 and the delivery vehicle 30 have been described in detail. It should be noted that in some of the above embodiments, unintentional exit of product items out through the side opening of the storage container during transportation was prevented by the delivery vehicle 30.

More specifically, the lower edge side opening container carrier 36SOE in FIGS. 7b and 7c prevented such unintentional exit out through the side opening during transportation. The entire side wall of the container carrier 30 in FIGS. 8b and 8c prevented such unintentional exit of product items out through the side opening of the storage container during transportation.

Moreover, in all of the above embodiments, the storage container 6 is carried by the delivery vehicle during unloading of product items. However, the storage container should also allow unloading of product items in a similar way without being carried by such delivery vehicles. In addition, loading should be possible as well.

It is now referred to FIG. 5. Here, the storage container 6 is shown to comprise a base 6B, two first parallel side walls 6S1 and two second parallel side walls 6S2 perpendicular to the two first parallel side walls. The base 6B is also shown with an upper base surface 6F, also referred to as the floor 6F.

The storage container 6 comprises a top opening 6T0. The top opening 6TO is configured to allow product items 5; 5a to be inserted into and/or retrieved from the storage container 6. Hence, product items may be loaded or unloaded also through this top opening 6TO.

Figure 16A:
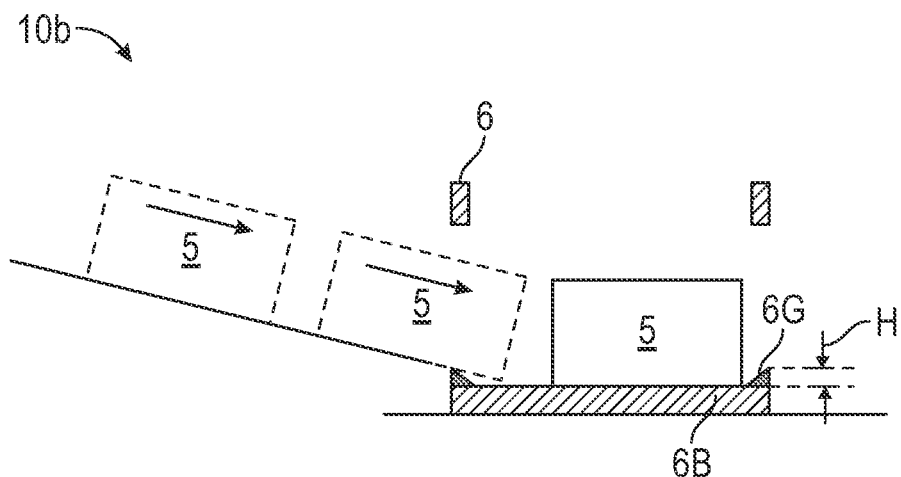
FIG. 16a illustrates a first embodiment of a loading station.
Figure 16B:
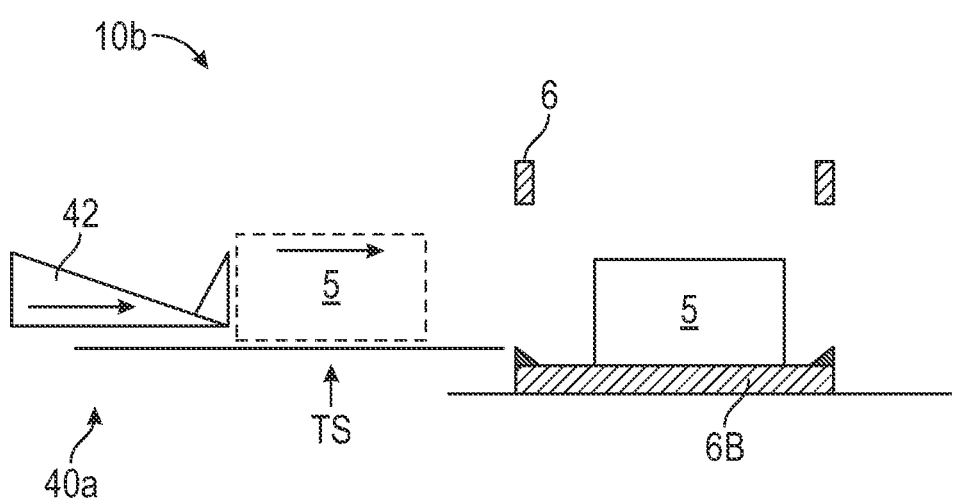
FIG. 16b illustrates a second embodiment of a loading station.

The storage container further comprises two side openings 6SO, to allow one or more items to be unloaded from the storage container 6 or loaded into the storage container through one of the side openings 6SO at an unloading station 10 or at a loading station 10a. The unloading station 10 for unloading storage container when the storage container is carried by the delivery vehicle is described in detail above. Similar principles may be used when unloading storage containers not being carried by any vehicle. Examples of the loading station is shown in FIGS. 16a and 16b and will be described further in detail below.

The side openings 6SO are equal in size and are aligned with each other. In FIG. 5 it is shown that they have a width Wso equal to the width W6 of the storage container 6 minus the thickness Ts2 of each of the second side walls 6S2. Hence, the side openings 6SO are as wide as the base surface 6F inside the storage container 6. In FIG. 5, the lower edge of the side openings 6SO are formed by the base surface 6F of the base 6B.

The two first parallel side walls 6S1 or the two second parallel side walls 6S2 comprises an upper vehicle connection interface 6CI. The upper vehicle connection interface 6CI may be formed by one or more cut-outs or apertures into the upper area of these walls, into which a lifting frame 354 (FIG. 1D) of a container handling vehicle 201, 301 or a lifting frame 54 of an unloading station, can be engaged.

The storage container is preferably made of moulded plastic with an array of moulded ribs, allowing the load of the product items carried by the base 6B to be transferred into the side walls and further to the top of the side walls where the upper vehicle connection interface 6CI is provided. The storage container may also be made of plastic reinforced with metal profiles inside or outside of the plastic material. It is also possible to make the entire storage container of a metal such as aluminum or an aluminum alloy.

The storage container 6 further comprise lower and upper stacking interfaces LSI, USI for allowing the storage container to be stacked in a stack together with other storage containers. The lower and upper stacking interfaces LSI, USI are configured to prevent relative horizontal movement between two adjacent storage containers stacked above each other.

The storage container 6 is further provided with a restraint which is arranged to restrain movement of the product items 5; 5a from exiting through one of the side openings 6SO during transportation of the storage container 6 to the unloading or loading station 10; 10a.

Embodiments and examples of such a restraint will be described below.

It is now referred to FIGS. 9a and 9b, FIG. 10c and FIG. 14.

Here, the restraint comprises a protrusion or lip 6G protruding upwardly from the base 6B at a lower edge of one of the side openings 6SO. Preferably, there are one lip 6G at the lower edge of each of the side openings 6SO.

Figure 14:
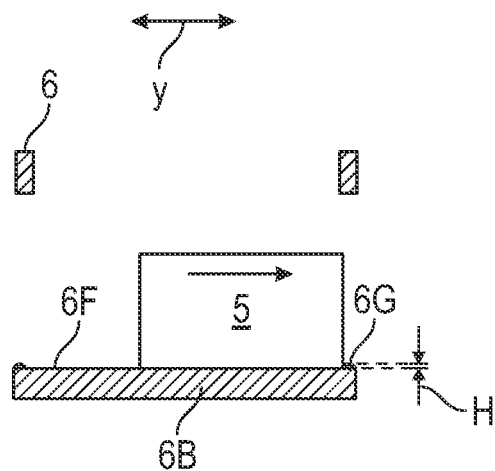
FIG. 14 shows how product items are restricted from moving due to the upwardly protruding lip.

In FIG. 6b, the first direction of movement is indicated with arrow X. In FIG. 14 and FIG. 6b, the second direction of movement is indicated with arrow Y, being perpendicular to the first direction Y.

During acceleration and retardation of the storage container, the product item within the storage container may move relative to the base surface 6F due to lack of sufficient friction between the product item and the base surface 6F. In FIG. 14, it is shown that the product item 5 has slipped and moved relative to the storage container towards the lip 6G on the right side. The lip 6G has here stopped further movement of the product item and hence has restrained movement of the product item 5 from exiting through the side opening.

In FIG. 14a the height of the lip 6G is indicated as height H1. This height may be from 0.5 mm and up 20 mm. The lip 6G may have a square or rectangular cross sectional shape, a triangular or rounded cross sectional shape. 5. For example, the lip 6G may be inclined or curved in a direction perpendicular to the first parallel side walls 6S1 to allow product items 5; 5a to be pushed or tipped over the lip 6G at the unloading or loading station. This is shown in FIGS. 9a, 9b and 10c.

The lip 6G may be provided as one continuous lip between the two second side walls 6S2, or it may be intermittent or broken, i.e. it is provided as a plurality of spaced apart lip sections. The height may also vary along the length of the lip.

In a further embodiment the lip 6G is movably connected to the base 6B, where the lip 6G is configured to be in one of the following positions:

an elevated position arranged to restrain movement of the one or more items from exiting through one of the side openings 6SO during transportation of the storage container to the unloading or loading station;

a lowered position arranged not to restrain movement of one or more items at the unloading or loading station.

The lip 6G may be biased to its elevated position, where an actuator is used to bring the lip to its lower position at the unloading or loading station.

The Storage Container—Second Embodiment

Figure 11A:
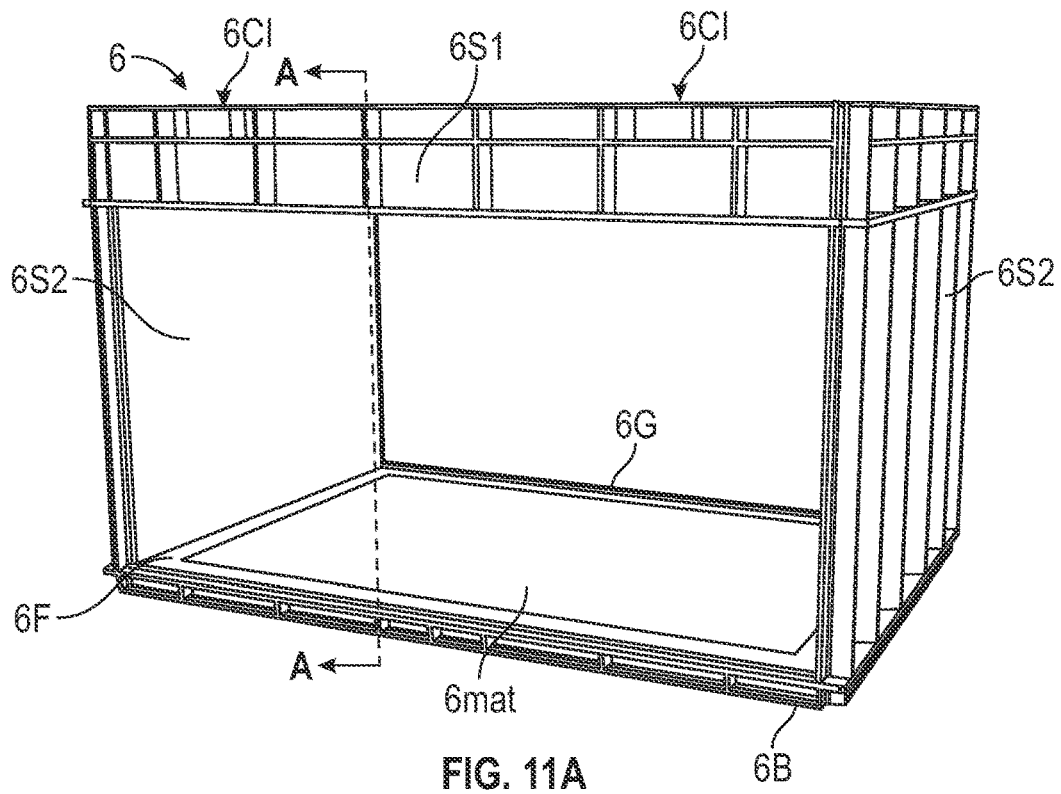
FIG. 11a shows another embodiment of the storage container.
Figure 11B:
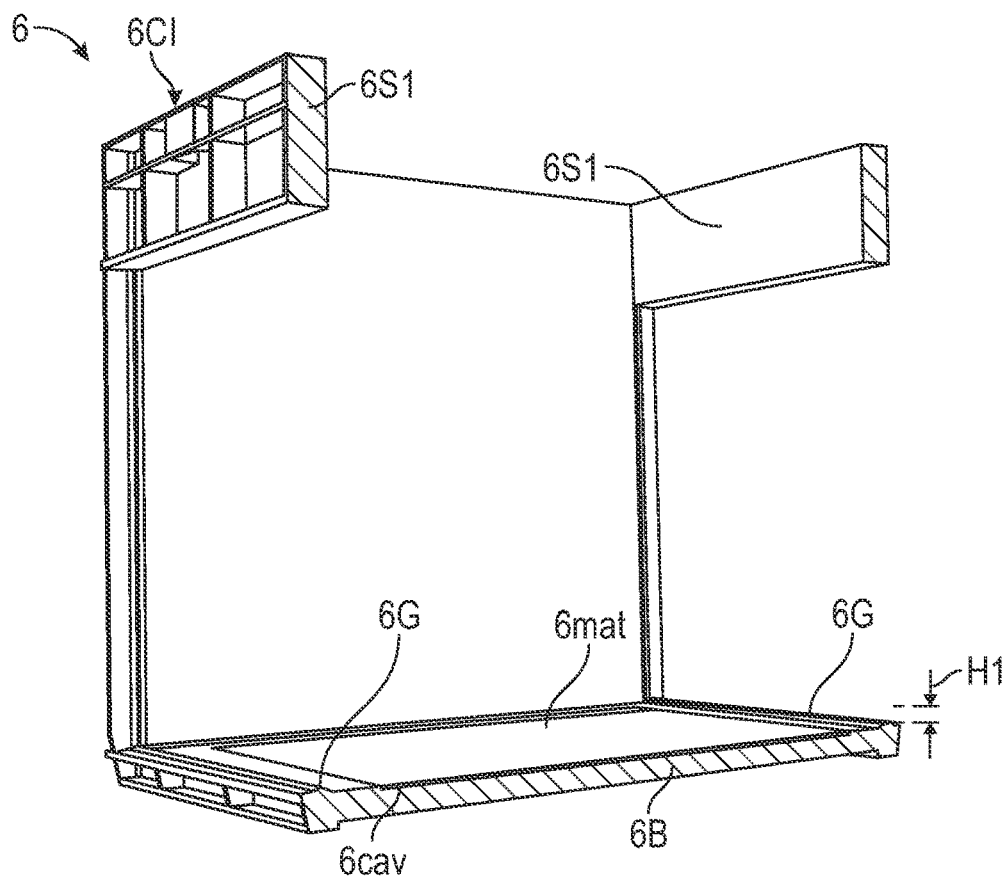

It is now referred to FIGS. 11a and 11b. The storage container is here similar to the first embodiment described above—and only differences between the first embodiment and the second embodiment will be described in detail herein.

In this embodiment, the restraint comprises a friction increasing material 6mat for increasing friction between the one or more product items and the upper surface 6F of the base 6B.

The friction increasing material 6mat may be a coating deposited to parts of, or the entire, upper surface 6F of the base 6B. The coating may be stuck, printed, sprayed, painted or in other ways applied the upper surface of the base 6B. The friction increasing material 6mat may be a granular material deposited to parts of, or the entire, upper surface 6F of the base 6B. Hence, the friction increasing material 6mat may be form an even surface, or an un-even surface.

In the above embodiment, the friction increasing material 6mat is relatively thin.

As shown in FIG. 11b, it is also possible to provide the friction increasing material 6mat as a filler material filled into a cavity 6cav provided in the upper surface of the base 6B.

The friction increasing material 6mat may be provided during the manufacturing of the storage container, for example as part of a two-component injection molding process. Alternatively, the friction increasing material may be applied in a subsequent step after the manufacturing of the storage container.

In one aspect, the friction increasing material 6mat may be integrated in the material of the upper surface 6F of the base 6B.

It should be noted that this friction increasing material type of restraint can be used in addition to, or as an alternative to, the lip-type of restraint 6G. In FIG. 11a and FIG. 11b it is shown that the storage container has both types of restraint.

Storage Container—Third Embodiment

Figure 12:
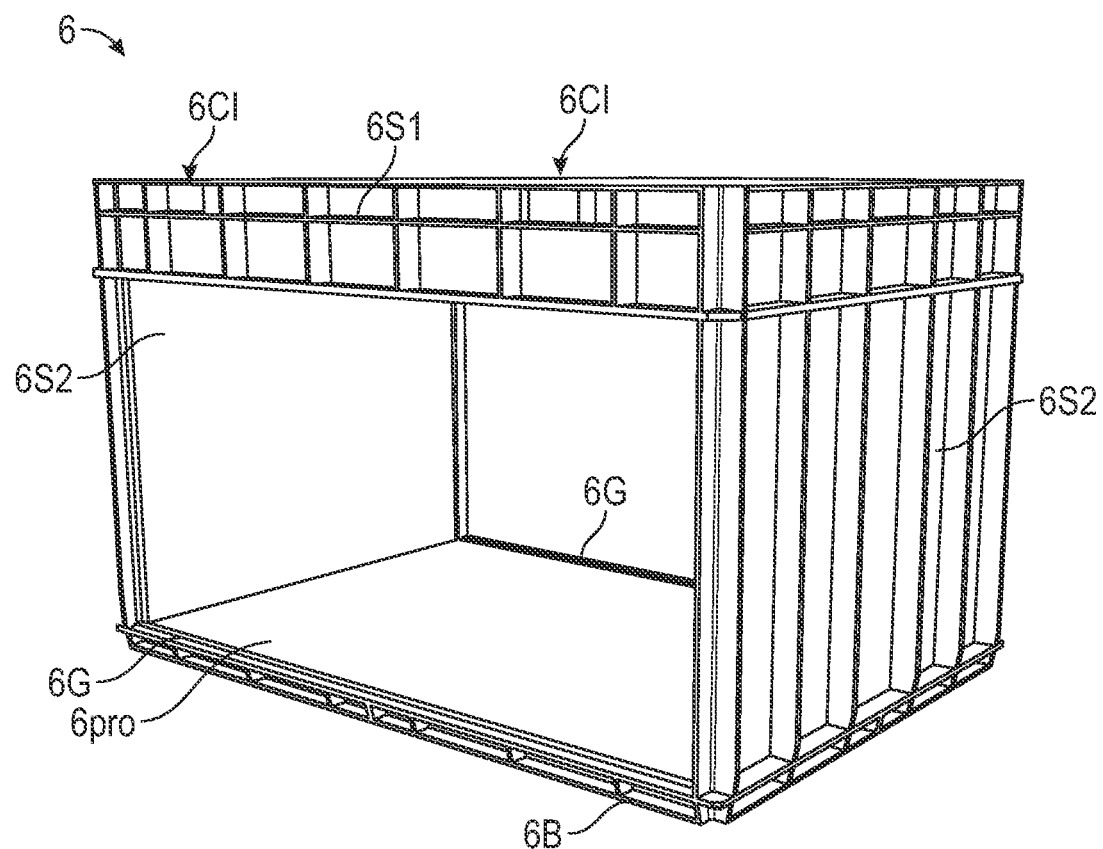
FIG. 12 shows yet another embodiment of the storage container.

It is now referred to FIG. 12. The storage container is here similar to the first embodiment described above—and only differences between the first embodiment and the third embodiment will be described in detail herein.

In this embodiment, the restraint comprises a three-dimensional surface structure or profile 6pro provided in the upper surface 6F of the base GB. The profile provided in the upper surface 6F of the base GB is here made of the same material as the base GB itself, which in the present embodiment is moulded plastic. In FIG. 12 it is shown that the profile comprises grooves and ridges.

Alternatively, the profile may comprise pedestals, steps, or other raised shapes or combination of such shapes.

It should be noted that this profile-type of restraint can be used in addition to or as an alternative to the friction increasing material type of restraint. For example, a friction increasing coating may be deposited onto the profiled base surface GF of the container in FIG. 12.

It should further be noted that this profile-type of restraint can be used in addition to or as an alternative to the lip type of restraint 6G.

In FIG. 12 it is shown that the container has both the profile type of restraint and the lip type of restraint.

Storage Container—Fourth Embodiment

It is now referred to FIG. 13a-e and FIG. 15a-c. The storage container is here similar to the first embodiment described above and only differences between the first embodiment and the fourth embodiment will be described in detail herein.

In this embodiment, the restraint comprises an elevatable floor GPS movably connected to the storage container 6. As shown in FIG. 13e, the elevatable floor 6PS comprises a plate-shaped structure with downwardly protruding legs 6L provided through apertures in the base 6B. Hence, the legs 6L are accessible from below the storage container 6. The legs 6L may comprise a stop 6ST for limiting the vertical movement of the elevatable floor 6PS in relation to the base 6B.

Figures 13A, 13B:
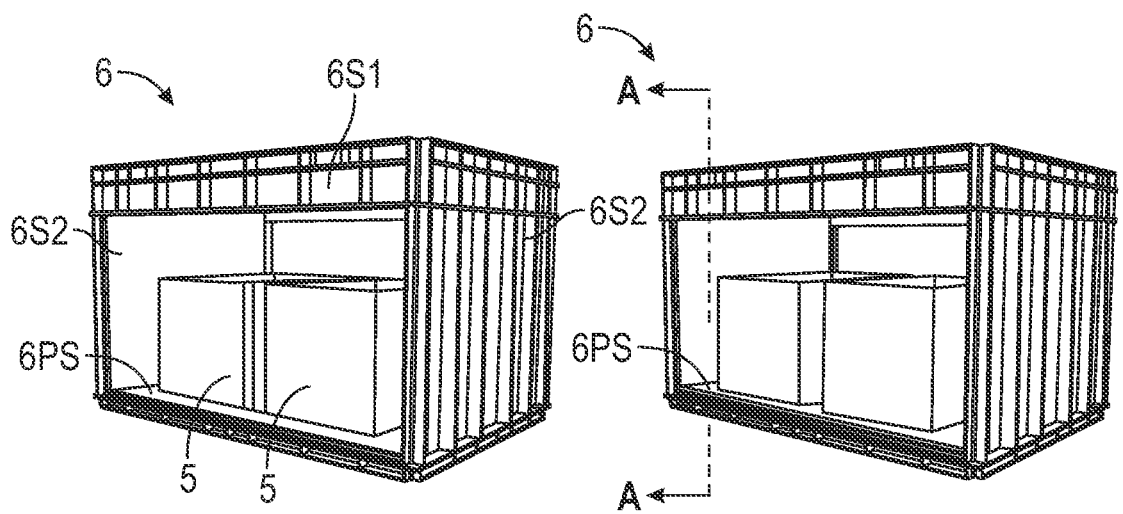
FIG. 13a shows yet a further embodiment of the storage container with a floor in a lower position.
FIG. 13b shows the embodiment of FIG. 13a with a floor in an upper position.
Figure 13C:
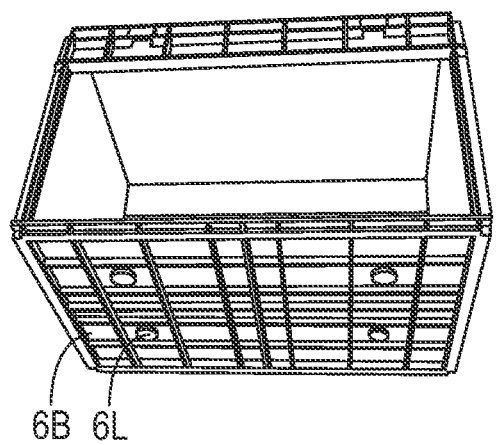
FIG. 13c shows the embodiment of FIG. 13a from below in the lower position.
Figure 13D:
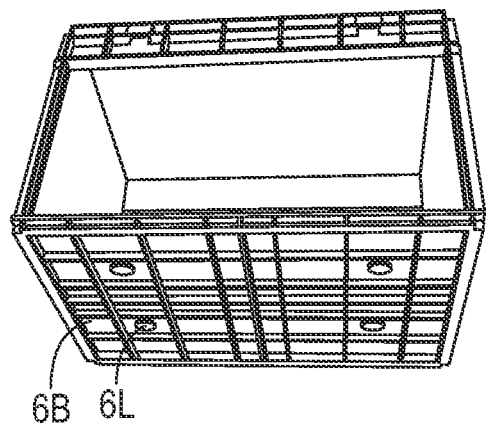
FIG. 13d shows the embodiment of FIG. 13b from below in the lower position.
Figure 13E:
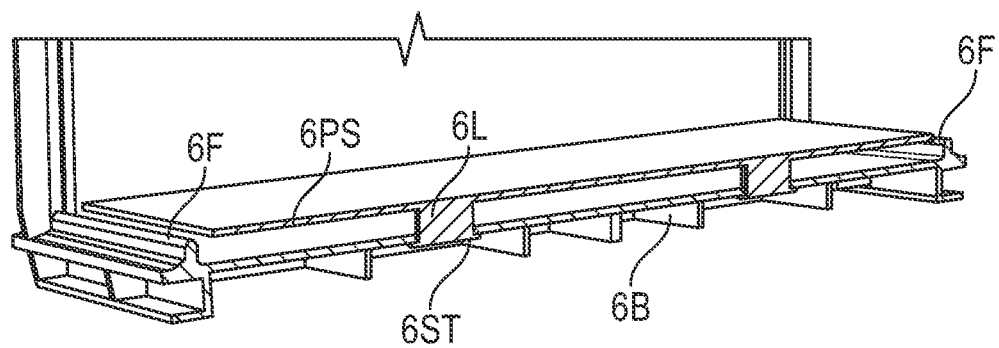
FIG. 13e shows the storage container in FIG. 13b in section along dashed line indicated by arrows A in FIG. 13b.
Figure 15A:
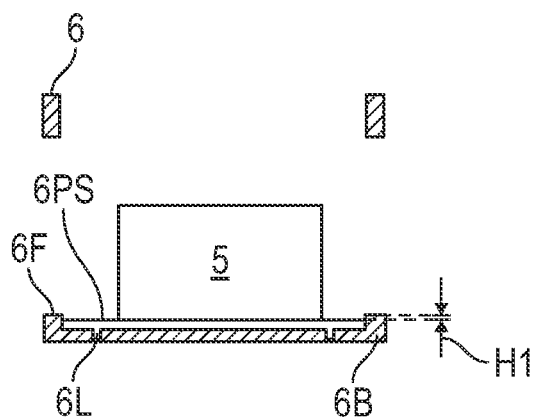
FIGS. 15a and 15b illustrates the lower and upper positions of the elevatable floor.

The elevatable floor 6PS may have to positions;

a lower position shown in FIGS. 13a, 13c and 15a, arranged to restrain movement of the one or more items from exiting through one of the side openings during transportation of the storage container to the unloading or loading station;

an upper position, arranged not to restrain movement of one or more items from exiting through one of the side openings at the unloading or loading station.

In the above embodiment, the elevatable floor 6PS is provided at an height H1 below the upper base surface 6F in the lower position, and the upper base surface 6F is provided on both sides of the elevatable floor 6PS. This height H1 is shown in FIG. 13e and FIG. 15a. Hence, the base or upper base surface 6F itself is restraining the movement of the product items out through one of the side openings. In the upper position, the elevatable floor 6PS is vertically aligned with, or provided higher than the upper base surface 6F.

Here, the upper base surface GF together with the elevatable floor 6PS forms a restraint.

The elevatable floor will be in the lower position during transportation to the unloading or loading station, while the elevatable floor is elevated to its upper position at the unloading or loading station.

The upper base surface 6F may be provided with a lip 6G.

In this embodiment, the elevatable floor 6PS is configured to be in the lower position due to gravity. Alternatively, the elevatable floor 6PS may be biased to be in the lover position, for example by means of a spring.

Figure 15B:
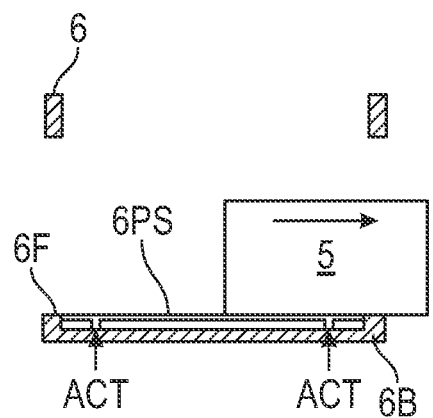
Figure 15C:
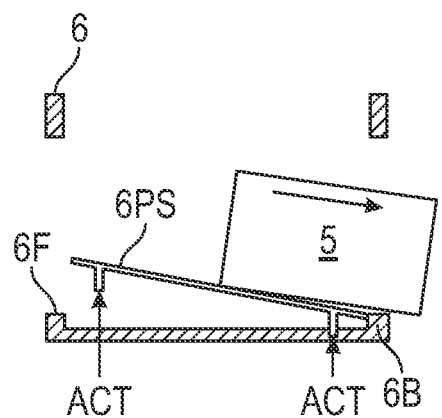
FIG. 15c illustrates an alternative upper position of the elevatable floor.

As the legs are accessible from below the storage container 6, an actuator may be used to move the elevatable floor 6PS from the lower position to the upper position, as shown in FIG. 15b. The actuator may be part of the storage container itself, for example integrated into the base 6B. Alternatively, the actuator may be integrated in the container handling vehicle and/or the delivery vehicle. In yet an alternative, the actuator may be provided as part of the unloading or loading station.

One aspect of this embodiment is shown in FIG. 15. Here it is possible for an actuator to tilt the elevatable floor 6PS and hence cause the product item 5 to slide out from the storage container. Here, at least some of the legs does not comprise stops 6ST.

Some aspects of this embodiment will now be described.

In one aspect, the elevatable floor 6PS comprises apertures and the storage container 6 comprises friction increasing members positioned in the apertures. These friction increasing members are typically secured to the base 6B. In the lower position, the elevatable floor 6PS is vertically aligned with, or lower than the friction increasing members. Here, the product items are in contact with the friction increasing members. In the upper position, the elevatable floor 6PS is higher than the friction increasing members. Now, the product items are only in contact with the elevatable floor 6PS. Here, the friction coefficient between the product item and the friction increasing members are higher than the friction coefficient between the product item and the elevatable floor.

Alternatively, friction reducing members may be positioned in the apertures of the elevatable floor, while the elevatable floor itself may comprise a friction increasing material. Here, the friction coefficient between the product item and the friction reducing members are lower than the friction coefficient between the product item and the elevatable floor. In this aspect, the elevatable floor will be in the upper position during transportation to the unloading or loading station, and the product item will be in contact with the friction increasing material of the elevatable floor. The elevatable floor is lowered to its lower position at the unloading or loading station, and the product item is then only in contact with the friction reducing members to simplify unloading or loading.

The above restraint is in particular arranged to restrain movement of the product items during movement of the storage container in the second direction Y.

The two second parallel side walls 6S2 have no openings. Hence, these walls may also be considered to be arranged to restrain movement of the product items 5; 5a during movement of the storage container 6, in particular in the first direction X.

Loading Station

It is now referred to FIG. 16a. Here it shown a loading station 10a where product items are loaded into the storage container along an inclined surface. The storage container may slide or roll or in other ways move along this inclined surface and into the storage container. The product item will enter the left side opening of FIG. 16a and stop its movement towards the restraint in the form of the lip 6G provided on the right side, i.e. the opposite side of the left side opening.

It is now referred to FIG. 16b. Here, a loading station 10a based on the same principles as the unloading station 10 described above, is shown. The loading station 10a comprises a loading device 40a with a loading member 42 for pushing the product item 5 from a temporary storage TS into the storage container. The temporary storage may be a conveyor or another type of temporary storage.

As shown in FIGS. 16a and 16b and several of the other embodiments, product items can be unloaded from and loaded into the storage container without the storage container being carried by a vehicle.

In the above description, the term "unloading" refers to pushing one or more product items out from the storage container 6 by means of an unloading member 42 of an unloading device 40 located at the unloading station 10. The term unloading may also refer to the tipping or tilting of the storage container 6 to cause the product item to slide out from the storage container through one of the side openings 6SO.

In the above description, the term "loading" refers to pushing one or more product items into the storage container 6 by means of a loading member 42 of a loading device 40a located at the loading station 10b, similar to the unloading member 42 of the unloading device 10. The term loading may also refer to product items sliding into the storage container through one of the side openings 6SO. The product items may for example slide down an inclined surface into the storage container.

In the above description, the term "station" is to be interpreted broadly. For example, the storage container may or may not be carried by a vehicle when unloading or loading is performed at the unloading or loading "station". Hence, a port is considered to be a station where loading or unloading of the storage container may take place.

In the preceding description, various aspects of the storage container according to the invention have been described with reference to the illustrative embodiment. For purposes of explanation, specific numbers, systems and configurations were set forth in order to provide a thorough understanding of the storage container and its workings. However, this description is not intended to be construed in a limiting sense. Various modifications and variations of the illustrative embodiment, as well as other embodiments of the storage container which are apparent to persons skilled in the art which the disclosed subject matter pertains, are deemed to lie within the scope of the present invention as defined by the appended claims.

REFERENCE NUMERALS

1 Automated storage and retrieval system
5 item
5a Product item
6 Storage container
6SO Side opening storage container
6F Floor of storage container
6B Base of storage container
6G Lip
6S1 First parallel side walls storage container
6TO Top opening storage container
10 Unloading station
20 Control system storage and retrieval system
30 Delivery vehicle
31 Vehicle body
32 Wheel arrangement
36 Container carrier
36F Floor of container carrier
36SO Side opening container carrier
36S1 First parallel side walls container carrier
36S2 Second parallel side walls container carrier
36TO Top opening container carrier
36SOE Lower edge side opening container carrier
36UE Upper edge container carrier
40 Unloading device
41 Base structure unloading device
42a First unloading member
42b Second unloading member
43a First contact surface of first unloading member
43b Second contact surface of unloading member
44a First actuator
44b Second actuator
48 Tilting/pivoting device
50 Container lifting device
51 First frame structure
52 Second frame structure
53 Lifting mechanism
54 Container lifting frame
60 Destination conveyor
61 Belt conveyor
100 Framework structure
102 Upright members of framework structure
103 Horizontal members of framework structure
104 Storage grid/three-dimensional grid
105 Storage column
106 Storage container
107 Stack
108 Rail system/Container handling vehicle rail system
110 First set of parallel rails in first direction (X)
110a First neighboring rail of first set
110b Second neighboring rail of first set
111 Second set of parallel rails in second direction (Y)
111a First neighboring rail of second set
111b Second neighboring rail of second set
115 Grid opening/Container handling vehicle grid opening
119 Delivery column
120 Delivery column
122 Grid cell/Container handling vehicle grid cell
140 Delivery system
150 Delivery port
151 Mezzanine level
152 Upright post
200 First container handling vehicle
201 Wheel arrangement
202,202' Container handling vehicle footprint
300 Second container handling vehicle
301 Wheel arrangement
X First direction
Y Second direction
Wo Width of container handling vehicle grid opening
Wc Width of container handling vehicle grid cell
Lo Length of container handling vehicle grid opening
Lc Length of container handling vehicle grid cell
Wod Width of delivery vehicle grid opening
Wcd Width of delivery vehicle grid cell
Lod Length of delivery vehicle grid opening
Lcd Length of delivery vehicle grid cell
H1 Height
H2 height
TD Target destination
CI Connection interface

The invention claimed is:

1. A storage container for storing product items in an automated storage and retrieval system, wherein the storage container comprises:
   a base;
   two first parallel side walls;
   two second parallel side walls perpendicular to the two first parallel side walls;
   an actuator;
   a top opening; and
   two side openings, to allow one or more items to be unloaded from the storage container or loaded into the storage container through one of the side openings at an unloading station or at a loading station;
   wherein the storage container is provided with a restraint which is arranged to restrain movement of the one or more items from exiting through one of the side openings during transportation of the storage container to the unloading or loading station;
   wherein the restraint comprises a lip, moveably connected to the base and protruding upwardly from the base at a lower edge of one of the side openings;
   wherein the lip is biased to an elevated position;
   wherein the lip is moved to a lowered position by the actuator;
   wherein the storage container comprises an upper vehicle connection interface.

2. The storage container according to claim 1, wherein the lip is continuous, intermittent or broken.

3. The storage container according to claim 1, wherein the lip is configured to be in one of the following positions:
   the elevated position arranged to restrain movement of the one or more items from exiting through one of the side openings during transportation of the storage container to the unloading or loading station;
   the lowered position arranged not to restrain movement of one or more items at the unloading or loading station.

4. The storage container according to claim 1, wherein the lip is inclined or curved in a direction perpendicular to the first parallel side walls to allow product items to be pushed over the upwardly protruding lip at the unloading or loading station.

5. The storage container according to claim 1, wherein the restraint comprises a friction increasing material for increasing friction between the one or more product items and the upper surface of the base.

6. The storage container according to claim 1, wherein the restraint comprises a profile provided in the upper surface of the base.

7. The storage container according to claim 1, wherein the restraint comprises an elevatable floor movably connected to the storage container between:
   a lower position, arranged to restrain movement of the one or more items from exiting through one of the side openings during transportation of the storage container to the unloading or loading station; and
   an upper position, arranged not to restrain movement of one or more items from exiting through one of the side openings at the unloading or loading station.

8. The storage container according to claim 7, wherein the elevatable floor comprises apertures and where the storage container comprises friction increasing members positioned in the apertures, wherein;
   in the lower position, the elevatable floor is vertically aligned with, or lower than the friction increasing members;
   in the upper position, the elevatable floor is higher than the friction increasing members.

9. The storage container according to claim 1, wherein:
   the restraint comprises an elevatable floor movably connected to the storage container between:
   a lower position, arranged to restrain movement of the one or more items from exiting through one of the side openings during transportation of the storage container to the unloading or loading station; and
   an upper position, arranged not to restrain movement of one or more items from exiting through one of the side openings at the unloading or loading station; and
   in the lower position, the elevatable floor is lower than the upwardly protruding lip;
   in the upper position, the elevatable floor is vertically aligned with, or higher than the upwardly protruding lip.

10. The storage container according to claim 7, wherein the elevatable floor is movably connected to the base of the storage container by means of a plurality of legs, wherein the plurality of legs is accessible from below the storage container.

11. The storage container according to claim 10, wherein at least one leg in the plurality of legs comprises a stop for limiting the vertical movement of the elevatable floor in relation to the base.

12. The storage container according to claim 1, wherein the storage container is made of moulded plastic.

13. The storage container according to claim 1, wherein the storage container comprises an array of moulded ribs, allowing the load of the product items carried by the base to be transferred into the side walls and further to the top of the side walls.

14. The storage container according to claim 1, wherein the storage container comprises lower and upper stacking interfaces for allowing the storage container to be stacked in a stack together with other storage containers.

15. The storage container according to claim 1, wherein the restraint comprises an elevatable floor movably connected to the storage container between:
   a lower position, wherein a surface of the elevatable floor is parallel to the base; and
   a tilted position, wherein a first side of the elevatable floor is raised to slide a product item out from the storage container.

* * * * *